US009798006B2

United States Patent
Lanzagorta

(10) Patent No.: US 9,798,006 B2
(45) Date of Patent: Oct. 24, 2017

(54) QUANTUM IMAGING FOR UNDERWATER ARCTIC NAVIGATION

(71) Applicant: Marco Lanzagorta, Alexandria, VA (US)

(72) Inventor: Marco Lanzagorta, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 17 days.

(21) Appl. No.: 14/800,769

(22) Filed: Jul. 16, 2015

(65) Prior Publication Data

US 2016/0018525 A1      Jan. 21, 2016

Related U.S. Application Data

(60) Provisional application No. 62/025,133, filed on Jul. 16, 2014.

(51) Int. Cl.
*G01S 17/89* (2006.01)
*G01C 21/20* (2006.01)
(Continued)

(52) U.S. Cl.
CPC .............. *G01S 17/89* (2013.01); *B63C 11/48* (2013.01); *G01C 21/20* (2013.01); *G01S 7/493* (2013.01);
(Continued)

(58) Field of Classification Search
None
See application file for complete search history.

(56) References Cited

U.S. PATENT DOCUMENTS

| 7,375,802 B2* | 5/2008 | Allen | G01S 7/41 342/105 |
| 2011/0026114 A1* | 2/2011 | Abe | G03B 21/58 359/461 |
| 2013/0258453 A1* | 10/2013 | Arahira | G02F 1/39 359/330 |

OTHER PUBLICATIONS

Wolfgramm et al., "Bright filter-free source of indistinguishable photon pairs," Opt. Express, vol. 16, p. 18145-18151 (2008); retreieved from internet [Sep. 16, 2015]; Retrieved from doi <10.1364/OE.16.018145>.*

(Continued)

*Primary Examiner* — Yara B Green
(74) *Attorney, Agent, or Firm* — U.S. Naval Research Laboratory; William Ladd

(57) ABSTRACT

A quantum photonic imaging device used in an underwater vehicle for stealthy detection of underwater objects includes a photon generating module that generates an entangled pair of photons that includes a signal photon and an ancilla photon, wherein the ancilla photon is retained within the device; a transmitter that transmits the signal photon towards a region of space for detecting an underwater object; a receiver that detects an incoming photon to the device; and a correlation module that distinguishes the signal photon that is reflected back to the receiver due to a presence of the object from environmental noise photons, wherein the distinguishing includes determining an entanglement correlation of the detected photon with the ancilla photon, and wherein a presence of the entanglement correlation between the detected photon and the ancilla photon indicates that the detected photon is the signal photon reflected back from the object.

20 Claims, 17 Drawing Sheets

(51) Int. Cl.
| | |
|---|---|
| G01S 17/93 | (2006.01) |
| G01S 17/02 | (2006.01) |
| G01S 17/87 | (2006.01) |
| G01S 7/493 | (2006.01) |
| B63C 11/48 | (2006.01) |
| G01S 19/14 | (2010.01) |
| G01S 15/08 | (2006.01) |
| B63G 8/00 | (2006.01) |
| B63G 8/28 | (2006.01) |
| G01S 19/18 | (2010.01) |

(52) U.S. Cl.
CPC .......... *G01S 17/023* (2013.01); *G01S 17/026* (2013.01); *G01S 17/87* (2013.01); *G01S 17/93* (2013.01); *B63G 8/001* (2013.01); *B63G 8/28* (2013.01); *G01S 15/08* (2013.01); *G01S 19/14* (2013.01); *G01S 19/18* (2013.01)

(56) References Cited

OTHER PUBLICATIONS

Einstein, Podolsky, and Rosen, "Can Quantum-Mechanical Description of Reality Be Considered Complete?" Physical Review, vol. 47, pp. 777-780, May 1935.*

L.D. Didomenico, H. Lee, P. Kok, and J.P. Dowling, "Quantum Interferometric Sensors", Proceedings of SPIE Quantum Sensing and Nanophotonic Devices, vol. 5359, 469 (Jan. 2004).

J.P. Dowling, "Quantum optical metrology—the lowdown on high-Noon states", Contemporary Physics, vol. 49, No. 2, pp. 125-143, (Jan. 2008).

V. Giovannetti, S. Lloyd, and L. Maccone, "Quantum Enhanced Positioning and Clock Synchronization", Nature 412, 417, (Jul. 2001).

V. Giovannetti, S. Lloyd, and L. Maccone, "Quantum-Enhanced Measurements: Beating the Standard Quantum Limit", Science, vol. 306, 1330 (Nov. 2004).

V. Giovannetti, S. Lloyd, and L. Maccone, "Quantum Metrology", Phys. Rev. Lett. 96, 010401 (Jan. 2006).

S. Hui-Tan, B.I. Erkmen, V. Giovannetti, S. Guha, S. Lloyd, L. Maccone, S. Pirandola, and J.H. Shapiro, "Quantum Illumination with Gaussian States", Phys. Rev. Lett. 101, 253601 (Oct. 2008).

S.D. Huver, C.F. Wildfeuer, and J. P. Dowling, "Entangled Fock states for robust quantum optical metrology, imaging, and sensing", Phys Rev A 78, 063828 (Aug. 2008).

M. Lanzagorta, "Quantum Radar Cross Sections", Proceedings of the Quantum Optics Conference, SPIE Photonics Europe, vol. 7727 (Jun. 2010).

S. Lloyd, "Enhanced Sensitivity of Photodetection via Quantum Illumination", Science, vol. 321, Issue 5895 (Sep. 2008).

J.H. Shapiro, "Quantum Pulse Compression Laser Radar", Proceedings of SPIE, Noise and Fluctuations in Photonics, Quantum Optics, and Communications, vol. 6603, 660306 (Jun. 2007).

J.F. Smith, "Quantum entangled radar theory and a correction method for the effects of the atmosphere on entanglement", Proceedings of the SPIE Quantum Information and Computation VII conference, vol. 7342 (Apr. 2009).

M. Lanzagorta, "Amplification of radar and lidar signatures using quantum sensors," Proc. SPIE 8734, Active and Passive Signatures IV, 87340C (May 2013).

* cited by examiner

QUANTUM IMAGING FOR UNDERWATER ARCTIC NAVIGATION

GOVERNMENT INTEREST

The embodiments described herein may be manufactured, used, and/or licensed by or for the United States Government without the payment of royalties thereon.

BACKGROUND

Technical Field

The embodiments herein relate to quantum information science (QIS), and more particularly to QIS used for underwater imaging and navigation.

Description of the Related Art

A major scientific thrust from recent years has been to try to harness quantum phenomena to increase the performance of a wide variety of information processing devices. QIS has emerged as a scientific undertaking that promises to revolutionize our information infrastructure. In particular, QIS offers the possibility of quantum sensors. That is, sensing devices that exploit quantum phenomena in such a way that they perform much better than their classical counterparts. Some examples of quantum sensing devices with a clear military application include radar, magnetometers, and gravimeters.

The stealthy navigation of underwater vehicles is a very challenging problem. Indeed, radio-frequencies and GPS signals are generally unable to penetrate water. Similarly, astronomical navigation using the position of the stars typically requires the vehicle to travel close to the surface of the sea, increasing the risk of detection. Also, acoustic sounding for navigation using bathymetry maps would reveal the position of the vehicle.

Therefore, current underwater navigation systems usually depend on sophisticated inertial navigation systems. These navigational tools mainly consist of accelerometers and gyroscopes to measure the motion and rotation of the vehicle. This information is constantly updated and used to calculate the best estimate of the current position, orientation, and velocity of the vehicle using dead reckoning techniques. Dead reckoning techniques are used to estimate the current position of a vehicle by using a known value of a previous position (known as a fix), and advancing the vehicle according to its measured velocity and plotted course.

The problem of underwater navigation is compounded if the vehicle is located in high latitudes; e.g., near the North Pole. In this situation, gyroscopes and compasses become unreliable and lead to big errors in the dead reckoning estimations made by the inertial navigation system. Indeed, the Arctic region contains the geomagnetic North Pole and Earth's rotation axis, which are the singular points for the operation of magnetic compasses and gyrocompasses, respectively.

Further challenges emerge if the vehicle is traveling under the Arctic ice shelf. The draft of the ice canopy varies from 0 to 100 feet, while the submerged portions of icebergs may extend many hundred feet under the sea. Also, it is known that the thickness and topography of the sea-ice canopy is highly variable throughout the year. Indeed, temperature variations and the effect of surface winds and underwater currents can drastically change the structure of the ice canopy. As a consequence, any possible ice canopy topographic maps may become obsolete very quickly.

Gravimeters and gravimetric maps can be used along the inertial navigation system. Gravimeters can be used along terrain and gravimetric maps to identify the current position of the vehicle, or as a real-time terrain estimation tool. Even though gravimetric terrain estimation systems are stealthy, current technology may not be able to fully resolve the ice canopy. Indeed, while the average density of typical sedimentary rocks (e.g. soil gravel, clay, sand) is of about the double of the density of water, ice density is about 90% of the density of water. In other words, the gravitational signature of sea ice is much weaker than the one from typical constituents of the ocean floor. However, quantum gravimeters could offer the possibility of highly sensitive sensors able to resolve the topography of the ice canopy.

In general, Arctic ice has the same strength as poor-grade concrete. Nonetheless, an accidental collision with the ice canopy could severely damage an underwater vehicle. To avoid collisions with the ice canopy, Arctic underwater vehicles use an active sonar array with acoustic sonar projections pointing towards the front, top and the bottom of the vehicle. This active sonar array system is shown in FIG. 1. These sensors provide information about how close the vehicle is with respect to the ice canopy and the ocean floor.

Unfortunately, in the case of Arctic military operations, active sonar will give away the position of the underwater vehicle. In addition, as shown in FIG. 2, the underwater vehicle has to navigate in the presence of a wide variety of natural and man-made obstacles.

Furthermore, a static target (zero Doppler) close to the ice canopy will be nearly invisible to most active and passive sensors. In other words, navigation close to the ice canopy offers tactical superiority. As such, underwater Arctic vehicles need to be highly maneuverable and able to ascend rapidly towards the ice canopy. To this end, the underwater vehicle generally requires having a very good estimation of the ice canopy topography. But then again, even though traditional sonar arrays are very efficient to elucidate the shape of the ice canopy, their strong acoustic signals give away the position of the underwater vehicle. Therefore, it is necessary to develop a stealthy system to aid in the highly maneuverable navigation of underwater Arctic vehicles.

SUMMARY

In view of the foregoing, an embodiment herein provides a quantum photonic imaging device used in an underwater vehicle for stealthy detection of underwater objects, the device comprising a photon generating module configured to generate an entangled pair of photons, wherein the pair of photons comprises a signal photon and an ancilla photon, and wherein the ancilla photon is retained within the device; a transmitter configured to transmit the signal photon towards a region of space for detecting an underwater object; a receiver configured to detect an incoming photon to the device; and a correlation module configured to distinguish the signal photon that is reflected back to the receiver due to a presence of the object from environmental noise photons, wherein the distinguishing comprises determining an entanglement correlation of the detected photon with the ancilla photon, and wherein a presence of the entanglement correlation between the detected photon and the ancilla photon indicates that the detected photon is the signal photon reflected back from the object.

The device may further comprise an information processing module configured to provide information using the detected photon to a terrain estimation module, when the correlation module detects the entanglement correlation between the detected photon and the ancilla photon. The object may comprise any of an Arctic ice canopy, ocean bottom, and another natural or artificial obstacle in the water that can obstruct under-ice passage of the vehicle in Arctic waters. The information processing module may be further configured to provide information about a range and geometry of the object to the terrain estimation module.

The terrain estimation module uses the information provided by the information module for navigation of the vehicle. The receiver may comprise a photosynthetic material. The photosynthetic material may comprise a J-Aggregate material. The photon generating module may generate photons using non-linear crystals. The correlation module may determine the entanglement correlation using controlled interferometric metrology. The photon generating module may be further configured to generate the signal photon with a brightness similar to a brightness of the environmental noise photons. The photon generating module may be further configured to generate the entangled pair of photons with a variable wavelength. The photon generating module may be further configured to vary the wavelength of the entangled pair of photons from approximately 460 nm to approximately 480 nm.

Another embodiment provides a method for stealthily detecting underwater objects by an underwater vehicle, the method comprising generating an entangled pair of photons, wherein the pair of photons comprises a signal photon and an ancilla photon, and wherein the ancilla photon is retained locally in a photonic sensor module; transmitting, using a transmitter, the signal photon towards a region of space for detecting an underwater object; detecting, using a receiver, an incoming photon; and determining an entanglement correlation of the detected photon with the ancilla photon to distinguish the signal photon that is reflected back to the receiver due to a presence of the object from environmental noise photons, wherein a presence of the entanglement correlation between the detected photon and the ancilla photon indicates that the detected photon is the signal photon reflected back from the object.

The method may further comprise providing information about a range and geometry of the object using the detected photon when the entanglement correlation between the detected photon and the ancilla photon is detected. The object may include any of an Arctic ice canopy, ocean bottom, and another natural or artificial obstacle in the water that can obstruct under-ice passage of the vehicle in Arctic waters. The information about the range and geometry of the object is used for navigating the vehicle. The detecting may comprise using photosynthesis to detect the incoming photon. The generating may comprise generating the signal photon with a brightness similar to a brightness of the environmental noise photons.

Another embodiment provides a system for navigating an underwater vehicle, the system comprising a quantum photonic imaging device configured to generate an entangled pair of photons, wherein the pair of photons comprises a signal photon and an ancilla photon, and wherein the ancilla photon is retained within the quantum photonic imaging device; transmit the signal photon towards a region of space for detecting an underwater object; detect an incoming photon using a receiver; and determine an entanglement correlation of the detected photon with the ancilla photon to distinguish the signal photon that is reflected back to the receiver due to a presence of the object from environmental noise photons, wherein a presence of the entanglement correlation between the detected photon and the ancilla photon indicates that the detected photon is the signal photon reflected from the object. The system further comprises a terrain estimation module configured to receive information about a range and geometry of the object from the quantum photonic imaging device, and to use the information for navigation of the vehicle.

The system may further comprise a gravity sensor module configured to obtain location information by measuring a local gravitational field; an inertial navigation module configured to obtain location information from any of a gyro, compass, accelerometer, and dead reckoning systems; a global positioning system (GPS) module configured to obtain location information from GPS satellites; and a sonar module configured to use an active sonar to measure a distance between the vehicle and the object, wherein the terrain estimation module may be further configured to receive further information about the object and a location of the vehicle from one or more of the gravity sensor module, the inertial navigation module, the GPS module, and the sonar module, and use the information for navigation of the vehicle.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
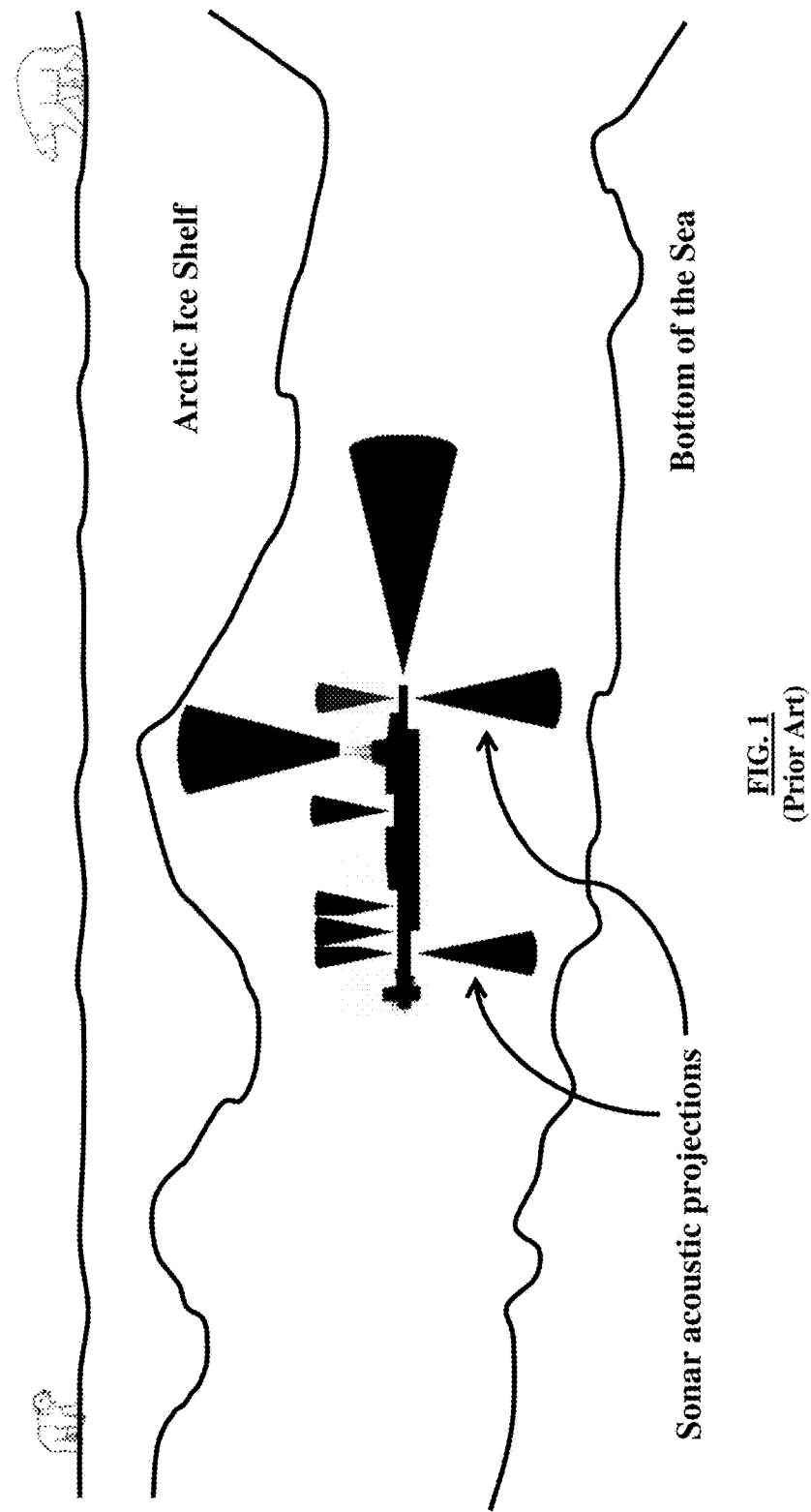
FIG. 1 is a schematic diagram illustrating an active sonar array system for underwater Arctic navigation.
Figure 2:
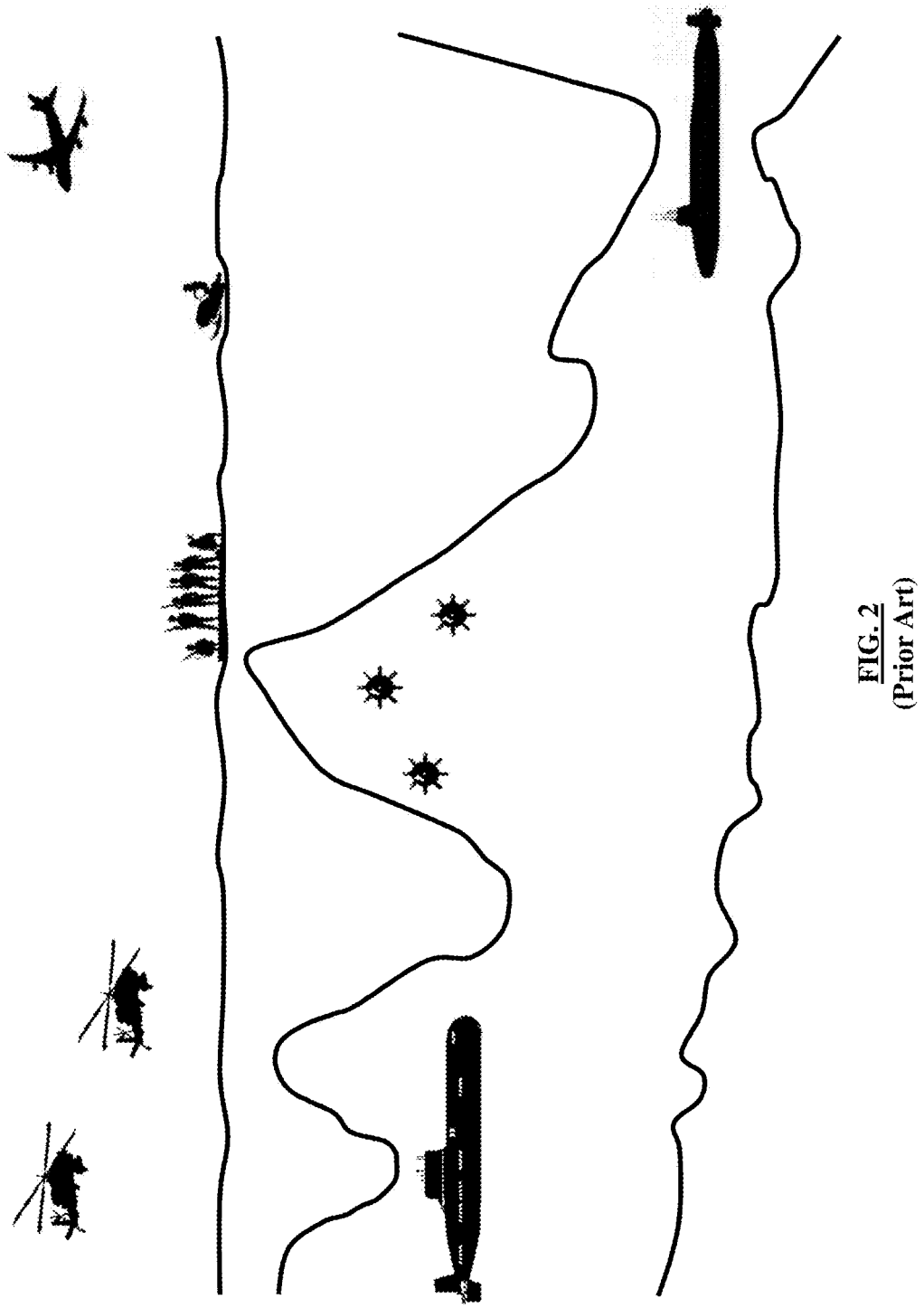
FIG. 2 is a schematic diagram illustrating some of the natural and man-made obstacles confronted by an Arctic underwater vehicle.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As generally described above, the precise navigation of underwater vehicles is a difficult task due to the challenges imposed by the variable oceanic environment. It is particularly difficult if the underwater vehicle is trying to navigate under the Arctic ice shelf. Indeed, in this scenario traditional navigation devices such as GPS, compasses and gyrocompasses are unavailable or unreliable. In addition, the shape and thickness of the ice shelf is variable throughout the year. Current Arctic underwater navigation systems include sonar arrays to detect the proximity to the ice. However, these systems are undesirable in a wartime environment, as the sound gives away the position of the underwater vehicle. The embodiments herein provide a quantum imaging system to enable the safe and stealthy navigation of underwater vehicles traveling under the Arctic ice shelf. Referring now to the drawings, and more particularly to FIGS. 3 through 15, where similar reference characters denote corresponding features consistently throughout the figures, there are shown preferred embodiments.

Figure 3:
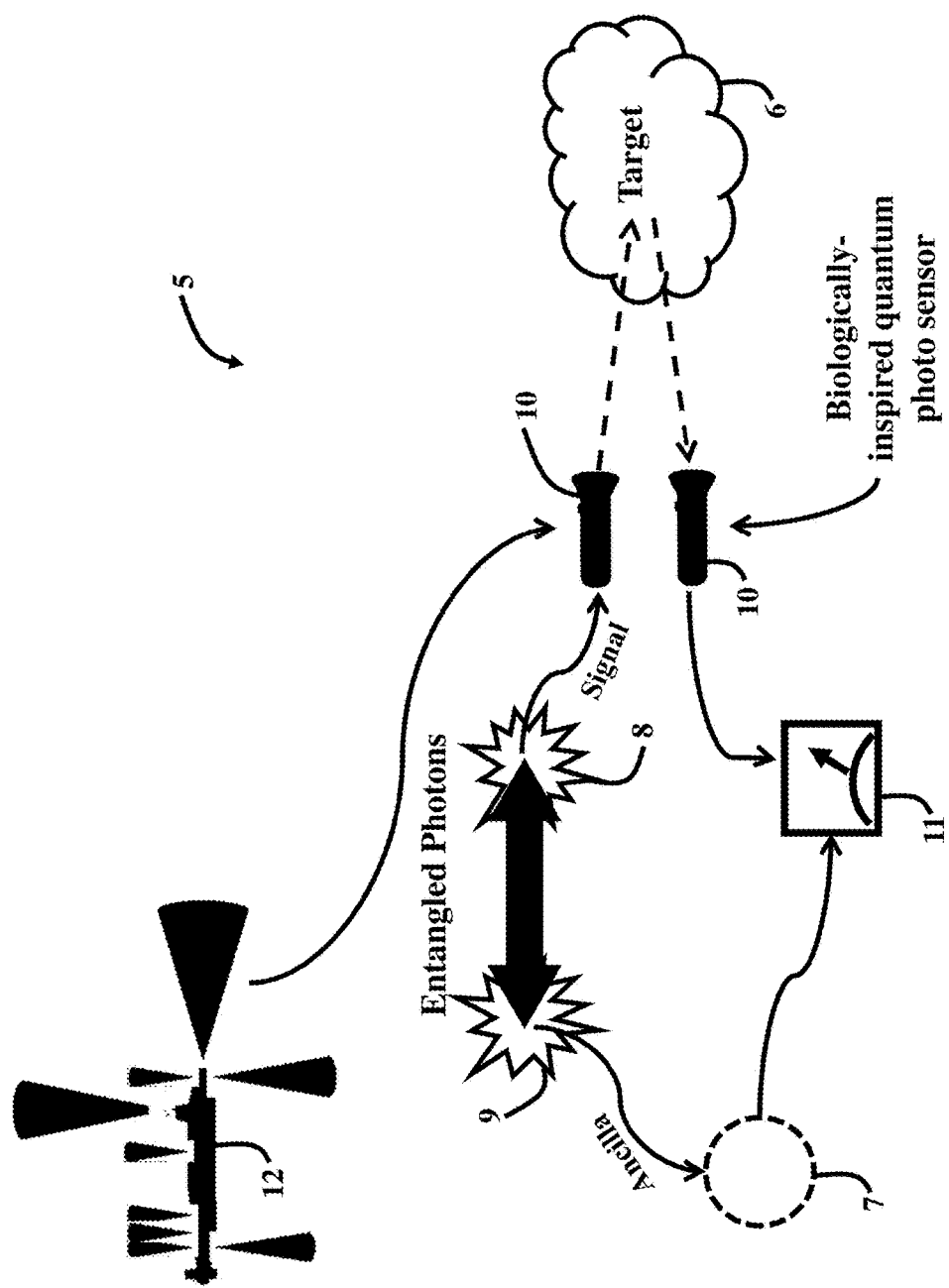
FIG. 3 is a schematic diagram illustrating a quantum imaging system for underwater Arctic navigation according to an embodiment herein.

A quantum imaging system 5 to enable underwater Arctic navigation according to the embodiments herein is shown in FIG. 3. Generally, the embodiments herein replace the active sonar array of the underwater vehicle 12 with a collection of low-brightness entanglement-based quantum sensors 10. In this system 5, an entangled pair of photons 8, 9 is produced; one photon 9 is retained within the sensor 10 while the other photon 8 is emitted towards a region of space. Then, entanglement correlations are used to distinguish between noise photons and those signal photons that are bounced back to a receiver 11 due to the presence of a target 6 (e.g., the ice shelf, the bottom, or another vehicle). The receiver 11 may be configured as a detector or any type of detecting device. Of particular interest is the possibility of these quantum sensors being able to resolve the geometry and extension of the seasonal ice shelf.

As further described below, the system 5 can operate in low brightness levels (using a small number of signal photons) and in an extremely noisy environment, making the sensing radiation practically invisible to those who don't have access to the entanglement correlations. In other words, the quantum sensor 10 hides the signal photons 8 within the environment noise, and the entanglement correlations are used to detect them.

The attenuation of light by water is much larger than atmospheric attenuation. Therefore, it is preferable to exploit the optical window of water located around 460-480 nm. Indeed, this small window corresponds to a region of least attenuation. To this end, the sensors 10 of the system 5 are configured as biologically-inspired quantum photosensors based on the quantum dynamics of energy transport observed in photosynthetic organisms. These sensors 10 are made of materials that attempt to mimic and synthesize the highly efficient transport phenomena observed in photosynthesis. These materials could allow the construction of photodetectors with very high efficiency (nearly 90% efficiency in the 460-480 nm range), surpassing the current capabilities provided by traditional avalanche photodetectors.

Figure 4A:
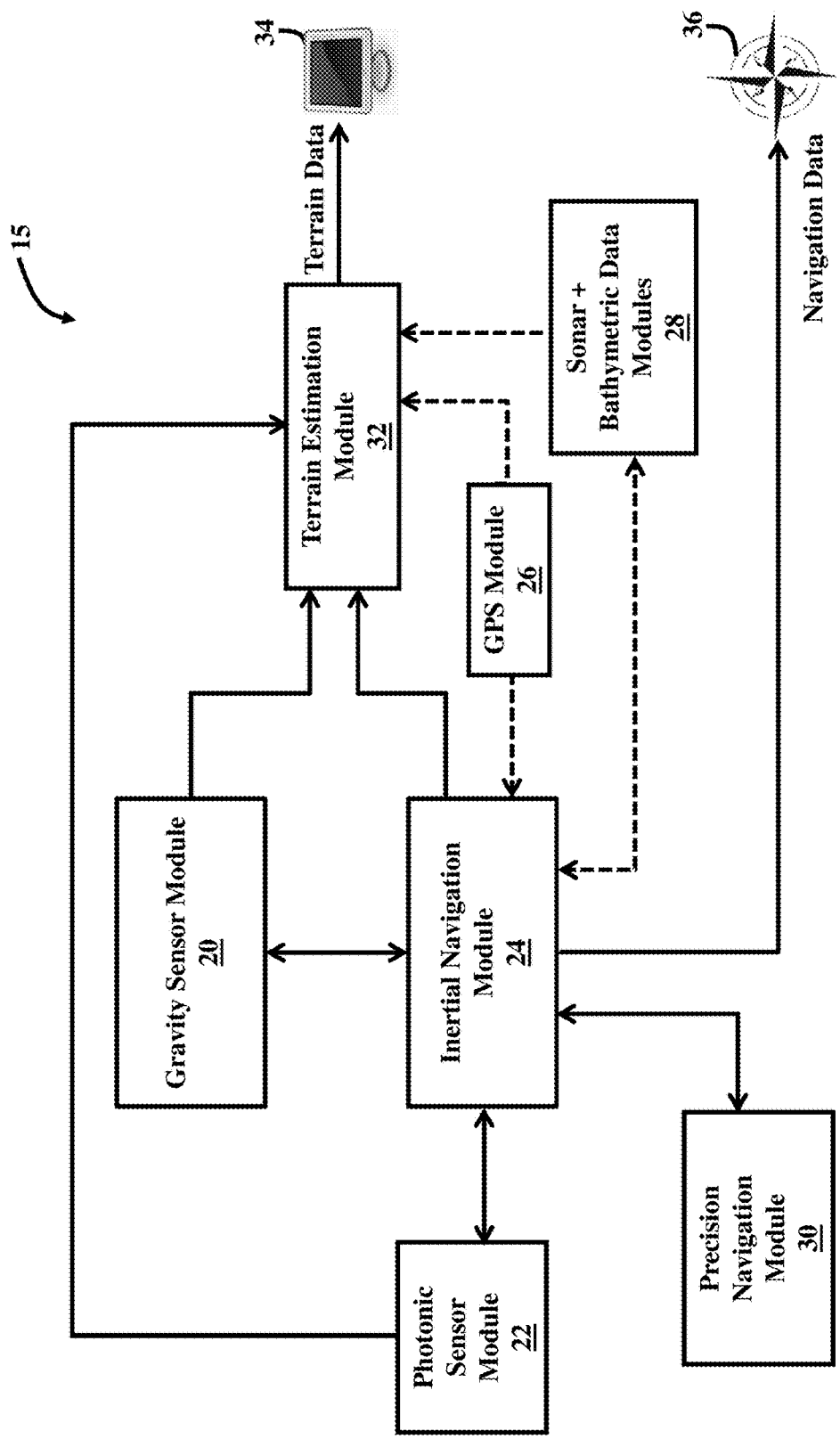
FIG. 4A is a schematic diagram illustrating a modular architecture for the underwater navigation system of FIG. 3 that uses quantum imaging to resolve underwater obstacles according to an embodiment herein.

A block diagram of the architecture 15 used for the quantum imaging system 5 of FIG. 3 for underwater Arctic navigation is shown in FIG. 4A. The architecture 15 is modular, which allows for optimal functionality even if one or more navigation modules are down. In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (such Oracle® relational databases), the data objects can be configured as a table or column. Other configurations include specialized objects, distributed objects, object oriented programming objects, and semantic web objects, for example. The data object models can be configured as an application programming interface for creating HyperText Markup Language HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

The system architecture 15 comprises a gravity sensor module 20, which may be configured as a gravity sensor or gravimeter to measure the local gravitational field. These measurements are compared to those found in locally stored gravimetry maps using the current estimated position. Any difference of value indicates the possibility of a navigation position error. A photonic sensor module 22 may be configured as an entanglement-based quantum sensor that provides information about the presence, range, and geometry of potential man-made or natural obstacles not reported in the most up-to-date gravimetry maps and navigational charts. The data can be used to correct current estimated navigation position by ranging a reported obstacle or geographic feature, or to plan the safe motion of the underwater vehicle 12.

An inertial navigation module 24 is configured to have access to inertial navigation tools such as gyros, compasses, accelerometers and dead reckoning systems. GPS module 26 is provided if the underwater vehicle 12 has access to GPS. Accordingly, module 26 uses the position data as a fix for the inertial navigation module and to pinpoint its position in a bathymetric data set stored in the terrain estimation module. However, access to GPS could compromise the stealthy operation of the underwater vehicle 12 (as it has to surface to establish a radio frequency link with the GPS satellite system). The sonar and bathymetric data module 28 uses an active sonar to measure the distance between the underwater vehicle 12 and the ocean floor and/or ice canopy. Module 28 relies on stored bathymetric maps to update the inertial navigation data. However, the use of active sonar compromises the stealthy operation of the underwater vehicle 12.

The precision navigation module 30 uses sophisticated data fusion techniques to combine ground speed information from a Doppler velocity sensor with data from the inertial navigation and gravity modules 24, 20. The terrain estimation module 32 uses gravimetric and photonic data to generate a 3D model of the terrain and Arctic ice surrounding the underwater vehicle 12. The terrain data display 34 permits terrain data to be rendered using traditional 3D computer graphics techniques. Display 34 provides situational awareness of the position of the underwater vehicle 12 with respect of the underlying terrain and surrounding ice structures. The navigation data display 36 is configured to allow the navigation data to be presented in the form of the current position and direction of motion of the underwater vehicle 12.

The output of the architecture 15, which comprises of terrain and actual navigation data, are used to plan the subsequent motion of the underwater vehicle 12. This enables the underwater vehicle 12 to perform stealthy and safe navigation in the challenging Arctic environment.

In an embodiment, a navigation system for an underwater vehicle is configured as hardware-enabled architecture 15 and includes photonic sensor module 22, terrain estimation module 32, gravity sensor module 20, inertial navigation module 24, GPS module 26, and sonar and bathymetric data module 28. In an embodiment, photonic sensor module 22 is a quantum photonic imaging device. Gravity sensor module 20 may obtain location information by measuring a local gravitational field. GPS module 26 may obtain location information from GPS satellites, and the sonar and bathymetric data module 28 may use an active sonar to measure the distance between the vehicle and an object.

The photonic sensor module 22 may generate an entangled pair of photons. The pair of photons includes a signal photon 8 and an ancilla photon 9. The ancilla photon 9 may be retained within the photonic sensor module 22. The photonic sensor module 22 may transmit the signal photon 8 towards a region of space for detecting an underwater object, and detect an incoming photon 7.

The photonic sensor module 22 may determine the entanglement correlation of the detected photon with the ancilla photon 9. Using the entanglement correlation, the photonic sensor module 22 may distinguish the signal photon 8 that is reflected back to the receiver 11 due to the presence of the object from environmental noise photons. The presence of the entanglement correlation between the detected photon and the ancilla photon 9 may indicate that the detected photon is the signal photon 8 reflected from the object.

In an embodiment, the terrain estimation module 32 receives information about the range and geometry of the object from the photonic sensor module 22, and uses the information for navigation of an underwater vehicle. In another embodiment, the terrain module 32 also receives information about the object and location of the vehicle from gravity sensor module 20, inertial navigation module 24, GPS module 26, or sonar and bathymetric data module 28.

Figure 4B:
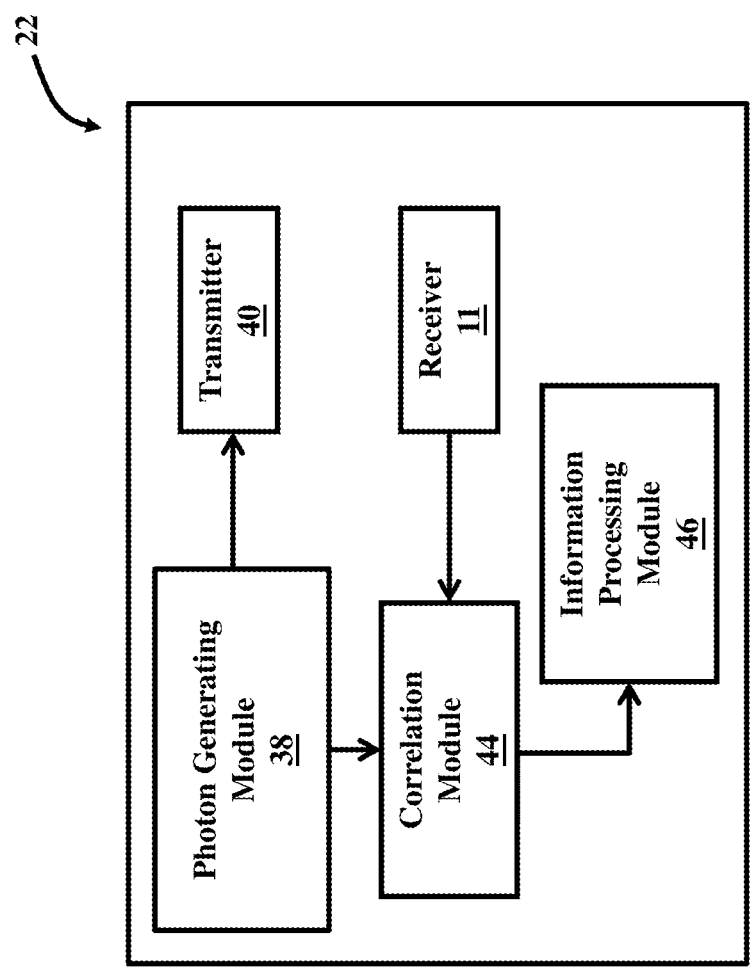
FIG. 4B is a schematic diagram illustrating a modular architecture for the photonic sensor module in FIG. 4A according to an embodiment herein.

The photonic sensor module 22 may be used in an underwater vehicle for stealthy detection of underwater objects. An exemplary embodiment of photonic sensor module 22 is shown in FIG. 4B. Photonic sensor module 22 may include a photon generating module 38, a transmitter 40, a receiver 11, a correlation module 44, and an information processing module 46.

The photon generating module 38 may generate an entangled pair of photons. In an exemplary embodiment, the photon generating module 38 generates photons using nonlinear crystals. The photon generating module 38 may generate the entangled pair of photons with a variable wavelength. In an exemplary embodiment, the photon generating module 38 generates the entangled pair of photons with a wavelength from approximately 460 nm to approximately 480 nm.

The entangled pair of photons may include a signal photon 8 and an ancilla photon 9. In an embodiment, the ancilla photon 9 is retained within the photonic sensor module 22. The photon generating module 38 may generate the signal photon 8 with a brightness similar to the brightness of the environmental noise photons. The transmitter 40 may transmit the signal photon 8 towards a region of space for detecting an underwater object. The receiver 11 may detect an incoming photon 7 to the imaging device (e.g., imaging system 5). An incoming photon 7 may be an environmental noise photon or the signal photon 8 reflected by an object. The object may be an Arctic ice canopy, ocean bottom, or another natural or artificial obstacle in the water that may obstruct under-ice passage of the vehicle in Arctic waters.

The correlation module 44 may distinguish the signal photon 8 that is reflected back to the receiver due to presence of the object from environmental noise photons that may be detected by receiver 11. The correlation module 44 may determine the entanglement correlation of the detected photon with the ancilla photon 9. The presence of the entanglement correlation between the detected photon and the ancilla photon 9 indicates that the detected photon is the signal photon 8 reflected back from the object. Using the entanglement correlation, the correlation module 44 may distinguish the signal photon 8 reflected by the object from noise photons. In an exemplary embodiment, the correlation module 44 determines the entanglement correlation using controlled interferometric metrology.

The information processing module 46 may provide information about the object to the terrain estimation module 32. The information processing module 46 may provide information about the range and geometry of the object to the terrain estimation module 32. The information processing module 46 may use the detected photon to generate and send information about the object. In an embodiment, when the correlation module 44 detects the entanglement correlation between the detected photon and the ancilla photon 9, the information processing module 46 sends information about the object to the terrain estimation module 32.

Figure 4C:
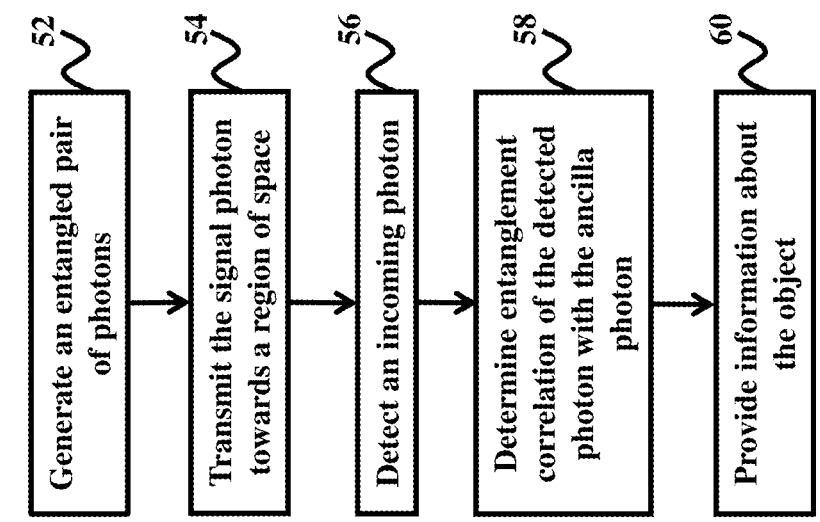
FIG. 4C is a flow diagram illustrating a method of operation of the photonic sensor module of FIG. 4B according to an embodiment herein.

FIG. 4C illustrates a method 50 of operating photonic sensor module 22 for stealthily detecting underwater objects according to an embodiment. At step 52, the method generates an entangled pair of photons. The pair of photons may comprise a signal photon 8 and an ancilla photon 9. The ancilla photon 9 may be retained locally in the photonic sensor module 22. At step 54, the method may transmit the signal photon 8, using transmitter 40, towards a region of space for detecting an underwater object. At step 56, the method may detect, using receiver 11, an incoming photon 7.

At step 58, the method may determine the entanglement correlation, using correlation module 44, of the detected photon with the ancilla photon 9. The method may use the entanglement correlation to distinguish the signal photon 8 that is reflected back to the receiver 11 due to the presence of the object from environmental noise photons. In an embodiment, the presence of the entanglement correlation between the detected photon and the ancilla photon 9 indicates that the detected photon is the signal photon 8 reflected back from the object.

At step 60, the method may provide, using the information processing module 46, information about the range and geometry of the object using the detected photon when the entanglement correlation between the detected photon and the ancilla photon 9 is detected.

Figure 5:
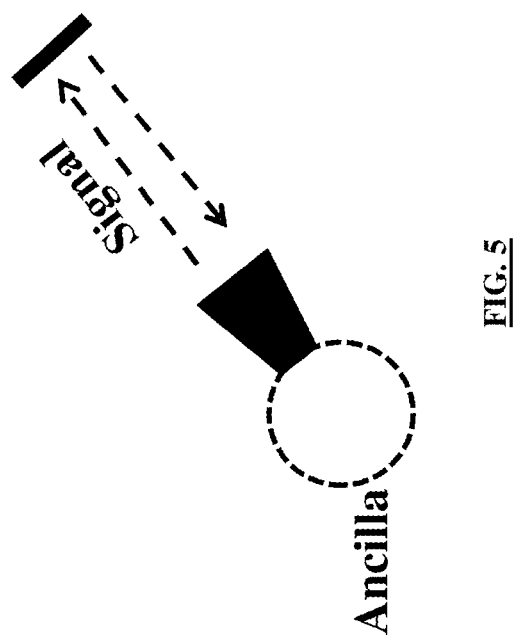
FIG. 5 is a schematic diagram illustrating an entanglement-based monostatic standoff quantum sensor according to an embodiment herein.

Standoff Quantum Sensing: The fundamental idea behind an entanglement-based standoff monostatic quantum sensor, either optical or radar, is shown in FIG. 5, with reference to FIGS. 3 and 4. A monostatic sensor means that the detector (e.g., receiver) and the emitter are in the same physical location. In the system 5, an entangled pair of photons 8, 9 is created. These are called the signal and the idler (or ancilla) photons 8, 9, respectively. The ancilla photon 8 is retained within the system 5 while the signal photon 8 is sent through a medium towards a potential target 6. With certain probability, the signal photon 8 may, or may not encounter the target 6. If the signal photon 8 does not encounter the target 6, then it will continue to propagate in space. In such a case all measurements performed by the receiver 11 will be of noise photons. On the other hand, if the target 6 is present and the signal photon 8 is "bounced back" towards the receiver 11, then it will be detected with certain probability. In a sense, the signal photon 8 is "tagged" because of the quantum correlations due to the entanglement, and therefore it will be "easier" to correctly identify it as a signal photon 8 rather than misidentify it as a noise photon.

Ancilla and Signal Photon States: First, a Gaussian entangled state is considered as the one produced in spontaneous parametric down-conversion (SPDC). In an occupation number Fock space, this state is given by:

$$|\Psi\rangle_{si} = \sqrt{1-\lambda^2} \sum_{n=0}^{\infty} \lambda^n e^{in\phi} |n\rangle_s |n\rangle_i \quad (1)$$

where $\lambda = \tan h|\xi|$, $\xi$ being the squeezing parameter. The subindices i and s refer to the ancilla and signal photons, 9, 8 respectively. Without loss of generality the phase $\phi$ can be set to zero, $\phi=0$. Then, for a zero-mean Gaussian state, the state can be written as:

$$|\Psi\rangle_{si} = \sum_{n=0}^{\infty} \sqrt{\frac{N_s^n}{(N_s+1)^{n+1}}} |n\rangle_s |n\rangle_i \quad (2)$$

where $N_s$ is the average photon number per mode:

$$N_s = \langle \alpha, \xi | \hat{n} | \alpha, \xi \rangle = \sin h^2|\xi| + |\alpha|^2 = \sin h^2|\xi| \quad (3)$$

for a zero-mean Gaussian state in which $\alpha=0$.

At first order in $\lambda$, the entangled Gaussian state can be written as:

$$\lambda = \sqrt{\frac{N_s}{N_s+1}} \ll 1 \Rightarrow |\Psi\rangle_{si} \approx \sqrt{1-\lambda^2}|00\rangle + \lambda|11\rangle \quad (4)$$

In practice, $\lambda \approx 10^{-2}$. And therefore $N_s \approx 10^{-4} \ll 1$.

The general two-mode Gaussian state can be represented through a Wigner-distribution covariance matrix that has the following form:

$$\Gamma_{si} = \frac{1}{4}\begin{pmatrix} S_1 & 0 & C_1 & 0 \\ 0 & S_2 & 0 & C_2 \\ C_1 & 0 & S_2 & 0 \\ 0 & C_2 & 0 & S_2 \end{pmatrix} \quad (5)$$

given in terms of only four parameters. Furthermore, it can be shown that the necessary and sufficient condition for separability of the Gaussian state can be simply written as:

$$(S_1 S_2 - C_1^2)(S_1 S_2 - C_2^2) \geq (S_1^2 + S_2^2) + 2|C_1 C_2| - 1 \quad (6)$$

which is usually referred as Simon's separability criteria. Also, one can define:

$$f \equiv (S_1 S_2 - C_1^2)(S_1 S_2 - C_2^2) - (S_1^2 + S_2^2) - 2|C_1 C_2| + 1 \quad (7)$$

And the separability criteria reduces to $f \geq 0$.

For the case under consideration, this becomes:

$$S \equiv S_1 = S_2 = 2N_s + 1 \quad C_q \equiv C_1 = -C_2 = 2\sqrt{N_s(N_s+1)} \quad (8)$$

which violates the inequality, and therefore, as expected, $|\Psi\rangle_{si}$ is an entangled state. In addition, one can easily find the maximum value of $C_q$, for which the state has some degree of entanglement. It is found that this upper bound corresponds to $C_c = 2N_s$. In other words, if $N_s \gg 1$, then $C_q \approx C_c$ and the entanglement is negligible. On the other hand, if $N_s \ll 1$, then $C_q \gg C_c$ and the state is highly entangled. That is, low brightness ($N_s \ll 1$) Gaussian states from SPDC showcase strong nonclassical signatures.

Propagation and Attenuation: First, consider a signal passing through an attenuating medium. The amount of energy absorbed and dissipated by the medium is described by the absorption coefficient $\chi_a$. Similarly, the energy scattered y the medium is described by the scattering coefficient $\chi_b$. Mathematically, absorption and scattering attenuate the energy of the signal as:

$$\Phi(r) = \Phi(0)e^{-\chi r} \quad (9)$$

where:

$$\chi = \chi_a + \chi_b \quad (10)$$

is the total attenuation coefficient and $\Phi(r)$ is the intensity of the signal after it has traversed a distance r in the attenuating medium.

The quantization of the electromagnetic field in attenuating media is much more complicated than in vacuum. The consistent theoretical treatment of attenuating media requires the quantization of interacting electromagnetic, matter, and reservoir fields.

However, it is possible to obtain simplified equations if one assumes that the medium is adequately described by a chain of beam splitters. Then, the traversal of the chain of beam splitters modifies the annihilation quantum operator into:

$$\hat{a}(w, z) \to e^{ikz - \chi(w)z/2} \hat{a}(w) + i\sqrt{\chi(w)} \int_0^z dx \, e^{ik - \chi(w)/2)(z-x)} \hat{b}(w, x) \quad (11)$$

where:

$$k = \frac{w\eta(w)}{c} \quad (12)$$

and $\eta(w)$ is the refraction index of the medium. As usual, the expression for the creation operator is the Hermitian-conjugate of $\hat{a}(w)$.

This quantization scheme offers a simpler phenomenological theory, where it is relatively easy to plug the experimental values for the attenuation coefficient $\chi$. Thus, the above expression is general in the sense that it can be applied to various types of physical media (e.g. vacuum, oceanic water or atmospheric air) by selecting the appropriate value of $\chi$.

It is convenient, however, to parametrize the attenuation of a quantum state in the following manner:

$$\hat{a}_r = \sqrt{\kappa}\hat{a}_s + \sqrt{1-\kappa}\hat{a}_b \quad (13)$$

where:

$$\kappa \equiv e^{-\chi(w)z} \quad (14)$$

is the signal attenuation and $\hat{a}_r$ is the annihilation operator for the returned photon state, which is composed with probability $\kappa$ of the original signal photon state $\hat{a}_s$ and with probability $1-\kappa$ of a noise photon state $\hat{a}_b$. In general, it is assumed to be a lossy environment, for which $\kappa \ll 1$ and $N_b \gg \kappa N_s$, where $N_b$ is the average number of noise photons.

Target Detection: As discussed above, the signal photon state may be bounced back towards the receiver 11 and be registered, or the receiver 11 may just measure noise photon states. Therefore, consider the following detection hypotheses:

Hypothesis $H_0$: there is no target 6 within range of the receiver 11. In this case, the receiver 11 will only measure noise photon states. The Wigner distribution covariance matrix is given by:

$$\Gamma_{ri}^{(0)} = \frac{1}{4}\begin{pmatrix} B & 0 & 0 & 0 \\ 0 & B & 0 & 0 \\ 0 & 0 & S & 0 \\ 0 & 0 & 0 & S \end{pmatrix} \quad (15)$$

where:

$$B = 2N_b + 1 \quad (16)$$

Furthermore, the separability criteria function is given by:

$$f_{ri}^{(0)} = 16 N_s N_b (N_s+1)(N_b+1) \geq 0 \quad (17)$$

which means that the state is not entangled.

Hypothesis $H_1$: the target 6 is within range of the receiver 11, and the signal photon state is measured with probability $\kappa$. In this case, the receiver 11 will only measure noise photon states. The Wigner distribution covariance matrix is given by:

$$\Gamma_{ri}^{(1)} = \frac{1}{4}\begin{pmatrix} A & 0 & C_r & 0 \\ 0 & A & 0 & -C_r \\ C_r & 0 & S & 0 \\ 0 & -C_r & 0 & S \end{pmatrix} \quad (18)$$

where:

$$A = 2(\kappa N_s + N_b) + 1 \quad C_r = 2\sqrt{\kappa N_s(N_s+1)} \quad (19)$$

Also, the separability criteria function is given by:

$$f_{ri}^{(1)} = 16 N_s (N_s+1)(\kappa - N_b)(N_b+1) \quad (20)$$

which means that the state is not entangled if $\kappa \leq N_b$. Then, if the attenuation K is large enough, the ancilla-signal photon entanglement is not expected to survive by the time the signal photon states arrive to the receiver 11. As described below, such is the case for photon states traveling through Arctic water over 460 m.

In general, under both hypotheses, the states at the receiver 11 are not entangled. Indeed, the environment has obliterated any degree of entanglement by the time the signal photon state returns to the receiver 11 (for targets 6 farther away than 230 m, so the total traveling distance for the signal photon states is greater than 460 m). Nonetheless, as described further below some of the initial quantum correlations expressed in the highly non-classical state with covariance matrix $\Gamma_{si}$ persist even after the total annihilation of the entanglement.

The next step is to discriminate between both hypothesis. In theory, this could be accomplished by measuring the operator $\hat{A}$ given by:

$$\hat{A} = \hat{\rho}_{ri}^{(1)} - \hat{\rho}_{ri}^{(0)} \tag{21}$$

where $\hat{\rho}_{ri}^{(1)}$ and $\hat{\rho}_{ri}^{(0)}$ are the density matrices that correspond to hypotheses 1 and 0, respectively. If the measurement yields a positive value, then the target 6 is declared to be within range. On the other hand, if the measurement yields a negative number, then the target 6 is declared to be out of range.

However, it is not a simple task to find the eigenvalues of $\hat{A}$. As a consequence, as described further below, in the most general case the theoretical analysis can only determine the bounds for the detection error probability.

Biologically-Inspired Quantum Photosensors: In spite of light attenuation, photosynthetic organisms thrive in the underwater ecosystem. But it is rather surprising that bacterial photosynthesis takes place deep within the Pacific Ocean, at depths in excess of 2,000 meters. This biological process is carried out by green-sulfur bacteria that are obligated photosynthetic organisms. That is, these organisms are required to conduct photosynthesis to survive. Even though at this depth the ocean is in total darkness to the human eye, the bacteria is able to efficiently absorb and process the dim light that comes from the sun or nearby hydrothermal vents.

Photosynthetic organisms possess molecular antenna systems that capture solar light and transport the energy to a metabolically expensive reaction center where the biochemical processes of photosynthesis begins. For many years it was conjectured that the transport of energy to the reaction center was due to classical energy transport mechanisms. However, it has recently been observed that photosynthetic proteins appear to use quantum coherence to transport energy in an efficient manner (nearly perfect quantum efficiency of the photo collection capture and transport processes). Indeed, quantum effects in photosynthetic light harvesting systems have been experimentally observed at cryogenic and at room temperature. These experiments require of sophisticated setups requiring ultra fast optics and 2D spectrography to detect the characteristic quantum signatures. In addition, theoretical efforts have proposed mechanisms that explain how quantum phenomena can be relevant at room temperature.

There are compelling reasons to attempt to construct devices that mimic photosynthetic energy transfer. For instance, current photosensors such as PIN, avalanche, and photomultiplicators use semi-classical charge transport processes based on the photoelectric effect. That is, light removes electric charge from a semiconductor's energy band and the resulting current is used as a signature of light. However, the big disadvantage of bulk semiconductors is that they require highly ordered crystalline phases that are rigid, expensive, and fragile. Furthermore, because of the strong absorption in their diffused surface layer, semiconductor devices are not optimal for the detection of light in the green-blue regime. In addition, these devices are not optimal because it is known that quantum transport is more efficient than classical transport.

One of the technical goals of the DARPA QuBE (Quantum Effects in Biological Environments) program was the design of novel kinds of photosensors. Theoretically, these sensors are made of new materials that attempt to synthesize the highly efficient quantum transport phenomena observed in photosynthesis. It is expected that these materials will allow the construction of photodetectors with a quantum efficiency of nearly 90% in the 460-480 nm range, surpassing the current capabilities provided by APD and PIN photodetectors.

One such candidate involves the use of J-Aggregate materials. These are molecules that self-assemble and exhibit quantum transport over hundreds of chromophores at room temperature. As a consequence, J-Aggregate materials appear to closely mimic the behavior of chlorosome antenna in green sulfur bacteria.

Target Signature Amplification: Next, the physical mechanism of interaction between the signal photon state and a potential target 6 are described. To this end, recall that it is possible to describe all the physical properties of specular reflections exclusively using QED processes of absorption and emission of photons by the atoms in a mirror. Following an interferometric analysis, it is found that the intensity measured by a receiver 11 after a photon is reflected by N atoms is given by:

$$\langle \hat{I}_s(r_s, r_d, t)\rangle = \frac{1}{N}\left|\sum_{i=1}^{N} \Psi_\gamma^{(i)}(\Delta R_i, t)\right|^2 \tag{22}$$

where the photon wave functions are approximated by:

$$\Psi_\gamma^{(i)}(\Delta R_i, t) = \frac{\varepsilon_0}{\Delta r_{id}} \Theta(t - \Delta R_i/c) e^{-(i\omega + \Gamma/2)(t - \Delta R_i/c)} \tag{23}$$

with:

$$\varepsilon_0 = -\frac{\omega^2 |\hat{\mu}|_{ab} \sin\eta}{4\pi\epsilon_0 c^2 \Delta r_{id}} \tag{24}$$

and $\Gamma$ represents the inverse of the lifetime of the excited state of the atom:

$$\Gamma \equiv \frac{1}{\tau} = \frac{1}{4\pi\epsilon_0} \frac{4\omega^3 |\hat{\mu}|_{ab}^2}{3\hbar c^3} \tag{25}$$

In the above expressions ω is the frequency of the incoming photon 7, and η is the angle between the electric dipole moment of the atom μ and $\Delta r_{id} = r_i - r_d$ is the distance between the $i^{th}$ atom and the receiver 11. In the context of quantum radar or lidar, $\Delta R_i$ is the total interferometric distance from the transmitter to the target 6, and from the target 6 to the receiver.

For monostatic sensors, as is the case under consideration, the source and the detector are at the same spatial location:

$$r_s = r_d \tag{26}$$

and therefore $$\Delta R_i = \Delta r_{si} + \Delta r_{id} \quad (27)$$
$$= |r_s - r_i| + |r_i - r_d|$$
$$= 2|r_i - r_d|$$

where $r_s$, $r_d$, and $r_i$ are the positions of the source, the receiver 11, and the $i^{th}$ atom respectively.

On the other hand, the resulting average intensity incident over all the N atoms that make the target 6 is (assuming the target 6 behaves as a photodetector):

$$\langle \hat{I}_i(r_s, t) \rangle = \frac{1}{N} \sum_{i=1}^{N} |\Psi_\gamma^t(\Delta r_{si}, t)|^2 \quad (28)$$
$$= \frac{1}{N} \sum_{i=1}^{N} \left(\frac{\varepsilon_0}{\Delta r_{si}}\right)^2 |\Theta(t - \Delta rsi/c) e^{-(i\omega + \Gamma/2)(t - \Delta r_{si}/c)}|^2$$
$$\approx \frac{1}{N} \left(\frac{\varepsilon_0}{R}\right)^2 \sum_{i=1}^{N} |\Theta(t - R/c) e^{-(i\omega + \Gamma/2)(t - R/c)}|^2$$

where it is presumed that in the region of interest:

$$\Delta r_{si} = |r_s - r_i| \approx R \,\forall i \quad (29)$$

This approximation can be made because the exponential terms in the equation of $\langle \hat{I}_i(r_s,t) \rangle$ do not form an interference pattern. Indeed, the absolute value is inside the summation symbol. In other words, there is only one possible path from the emitter to the target 6.

The $\Theta$ step function merely indicates that the signals will not propagate faster than the speed of light. With this understanding, it can be removed from the equation to simplify the notation. Therefore:

$$\langle \hat{I}_i(r_s, t) \rangle \approx \left(\frac{\varepsilon_0}{R}\right)^2 e^{-\Gamma(t - R/c)} \quad (30)$$

and as a consequence, the integration over the orthogonal projected area of the target 6 gives:

$$\int_{T_\perp(\theta,\phi)} \langle \hat{I}_i(r_s,t) \rangle \, dS \approx A_\perp(\theta,\phi) \langle \hat{I}_s(r_s,t) \rangle \quad (31)$$

If the absorption effects are ignored, energy conservation in the optical regime requires that all incident energy has to be reflected in some direction. That is, integrating the position of the receiver 11 over a spherical surface $S_{R_d}$ of radius $R_d$:

$$\int_{T_\perp(\theta,\phi)} \langle \hat{I}_i(r_s,t) \rangle \, dS \approx \lim_{R_d \to \infty} \int_{S_{R_d} \supset T} \langle \hat{I}_s(r_s, r_d, t) \rangle R_d^2 \, d\Omega_d \quad (32)$$

which can be approximated by:

$$A_\perp(\theta,\phi)\langle \hat{I}_s(\bar{r}_t, t) \rangle \approx \lim_{R_d \to \infty} \int_0^{2\pi} \int_0^\pi \langle \hat{I}_s(r_s, r_d, t) \rangle R_d^2 \sin\theta \, d\theta \, d\phi \quad (33)$$

At this point it is convenient to define how good of a reflector is a given target. To this end, the quantum cross section $\sigma_Q$ is defined, which is able to provide an objective measure of the visibility of the target. Even though the word "radar" is being used, the embodiments herein, analysis, and formulae takes into consideration multiple wavelengths and accordingly, the embodiments herein are not restricted to the microwave regime.

By definition, $\sigma_Q$ has to depend explicitly on $\langle \hat{I}_s(r,\theta,\phi,t) \rangle$, the scattered intensity at the receiver:

$$\sigma_Q \propto \langle \hat{I}_s(r,\theta,\phi,t) \rangle \quad (34)$$

because in the large photon limit:

$$\lim_{n_\gamma \to \infty} \langle \hat{I}_s(r, \theta, \phi, t) \rangle \propto |E_{s@r}|^2 \quad (35)$$

where $E_{s@r}$ is the electric field of the scattered classical radar electromagnetic wave at the receiver. Then, in analogy to the classical radar cross section ($\sigma_C$), it is reasonable to define the quantum cross section $\sigma_Q$ as:

$$\sigma_Q \equiv \lim_{R \to \infty} 4\pi R^2 \frac{\langle \hat{I}_s(r_s, r_d, t) \rangle}{\langle \hat{I}_i(r_s, t) \rangle} \quad (36)$$

and if we assume energy conservation in the optical regime, then $\sigma_Q$ for a monostatic quantum sensor can be approximated by:

$$\sigma_Q \approx 4\pi A_\perp(\theta,\phi) \lim_{R_d \to \infty} \frac{\langle \hat{I}_s(r_s = r_d) \rangle}{\int_0^{2\pi} \int_0^\pi \langle \hat{I}_s(r_s, r_d) \rangle \sin\theta_d \, d\theta_d \, d\phi_d} \quad (37)$$

where the expectation value of the scattered intensity is taken at the receiver.

So far the above analysis has considered the structure of $\sigma_Q$ for the case of single photon signals in the quantum signal pulse. It is very easy to generalize the equations to describe quantum signal pulses with $\eta_\gamma$ photons. The definition of $\sigma_Q$ is the same, but a new expression for $\langle \hat{I}_s(r_d,t) \rangle$ is needed.

As an example, consider the case of two photons, $\eta_\gamma = 2$, one with momentum p and the other with momentum q (and for simplicity the polarization states are ignored). In this case, the photodetector needs to detect two photons, one at (r, t) and another at (r', t').

Then, the transition amplitude of the detector signaling the detection of the two photons is given by:

$$a_f(r,t,r',t') = \langle 0|\hat{E}^{(+)}(r,t)\hat{E}^{(+)}(r',t')|1_p 1_q \rangle \quad (38)$$

and the measured intensity is:

$$\langle \hat{I}_{pq}(r, t, r', t') \rangle = |a_f(r, t, r', t')|^2 \quad (39)$$
$$= |\langle 0|\hat{E}^{(+)}(r, t)\hat{E}^{(+)}(r', t')|1_p 1_q \rangle|^2$$
$$= |\Psi_{pq}(r, t, r', t')|^2$$

Now, using the expressions for the quantum fields and the Fock states, the following are derived:

$$\Psi_{pq}(r, t, r', t') = \tag{40}$$

$$\langle 0|\hat{E}^{(+)}(r, t)\hat{E}^{(+)}(r', t')|1_p 1_q\rangle \propto \langle 0|(\hat{a}_p e^{-i(\omega_p t - p \cdot r)} + \hat{a}_q e^{-i(\omega_q t - q \cdot r)}) \times$$

$$(\hat{a}_p e^{-i(\omega_p t' - p \cdot r')} + \hat{a}_q e^{-i(\omega_q t' - q \cdot r')})|1_p 1_q\rangle \propto$$

$$e^{-i(\omega_p t - p \cdot r)} e^{-i(\omega_q t' - q \cdot r')} \langle 0|(\hat{a}_p \hat{a}_p)|1_p 1_q\rangle +$$

$$e^{-i(\omega_p t - p \cdot r)} e^{-i(\omega_q t' - q \cdot r')} \langle 0|(\hat{a}_p \hat{a}_q)|1_p 1_q\rangle +$$

$$e^{-i(\omega_q t - q \cdot r)} e^{-i(\omega_p t' - p \cdot r')} \langle 0|(\hat{a}_q \hat{a}_p)|1_p 1_q\rangle +$$

$$e^{-i(\omega_q t - q \cdot r)} e^{-i(\omega_q t' - q \cdot r')} \langle 0|(\hat{a}_q \hat{a}_q)|1_p 1_q\rangle \propto$$

$$e^{-i(\omega_p t - p \cdot r)} e^{-i(\omega_q t' - q \cdot r')} + e^{-i(\omega_q t - q \cdot r)} e^{-i(\omega_q t' - p \cdot r')} \propto$$

$$\Psi_{\gamma p}(r, t)\Psi_{\gamma q}(r', t') + \Psi_{\gamma q}(r, t)\Psi_{\gamma p}(r', t')$$

where the following are assumed:

$$\langle 0|(\hat{a}_p \hat{a}_q)|1_p 1_q\rangle = \langle 0|(\hat{a}_q \hat{a}_p)|1_p 1_q\rangle \propto 1$$

$$\langle 0|(\hat{a}_p \hat{a}_p)|1_p 1_q\rangle = \langle 0|(\hat{a}_q \hat{a}_q)|1_p 1_q\rangle \propto 0 \tag{41}$$

which is a consequence that $\hat{a}_p(\hat{a}_q)$ destroys a photon of momentum p (q).

Therefore, the intensity is given by:

$$\langle I_{pq}(r; t, r', t')\rangle \propto |\Psi_{\gamma p}(r; t)\Psi_{\gamma q}(r', t') \Psi_{\gamma q}(r; t)\Psi_{\gamma p}(r', t')|^2 \tag{42}$$

which depends on a symmetric bipartite wave function as required by Bose-Einstein statistics. Furthermore, in general:

$$\langle I_{pq}(r; t, r', t')\rangle \neq |\Psi_{\gamma p}(r; t)|^2 |\Psi_{\gamma q}(r', t')|^2 \tag{43}$$

or equivalently:

$$\langle I_{pq}\rangle \neq \langle I_p\rangle\langle I_q\rangle \tag{44}$$

which means that the two photodetections at (r, t) and (r', t') are not independent but are correlated. The reason for this behavior is that each of the detection events gives some information about the state of the quantum field, and this information has an influence on the estimates of subsequent detections. As a consequence, this is a quantum mechanical effect due to the interference between the photon states in the symmetric bipartite state shown in Equation (40). Indeed, it is only possible to factorize the contributing intensities for states that represent classical light.

Next, the case of three atoms (N=3) scattering two photons ($\eta_\gamma=2$) are considered. In this case:

$$\langle \hat{I}(r_d, t)\rangle = \frac{1}{3}|\Psi_{\gamma_1}^{(1)}\Psi_{\gamma_2}^{(2)} + \Psi_{\gamma_1}^{(2)}\Psi_{\gamma_2}^{(3)} + \Psi_{\gamma_1}^{(3)}\Psi_{\gamma_2}^{(1)}|^2 \tag{45}$$

where the wave function subindex marks the photon and the upper index identifies the scattering atom. That is, the two photons can interact with any of the three atoms, and all possible combinations contribute to the interference pattern. There is no permutation over the photon indices because the photons are bosons, and therefore indistinguishable from each other.

Then, for N atoms and $\eta_\gamma$ photons:

$$\langle \hat{I}(r_d, t)\rangle = \frac{1}{\binom{N}{n_\gamma}}\left|\Gamma_{a_1 a_2 \ldots a_{n_\gamma}} \prod_{j=1}^{n_\gamma} \Psi_{\gamma j}^{(a_j)}\right|^2 \tag{46}$$

where $a_i$=1, 2, . . . N, and sum over equal "$a_i$" indices is implied.

Figure 6:
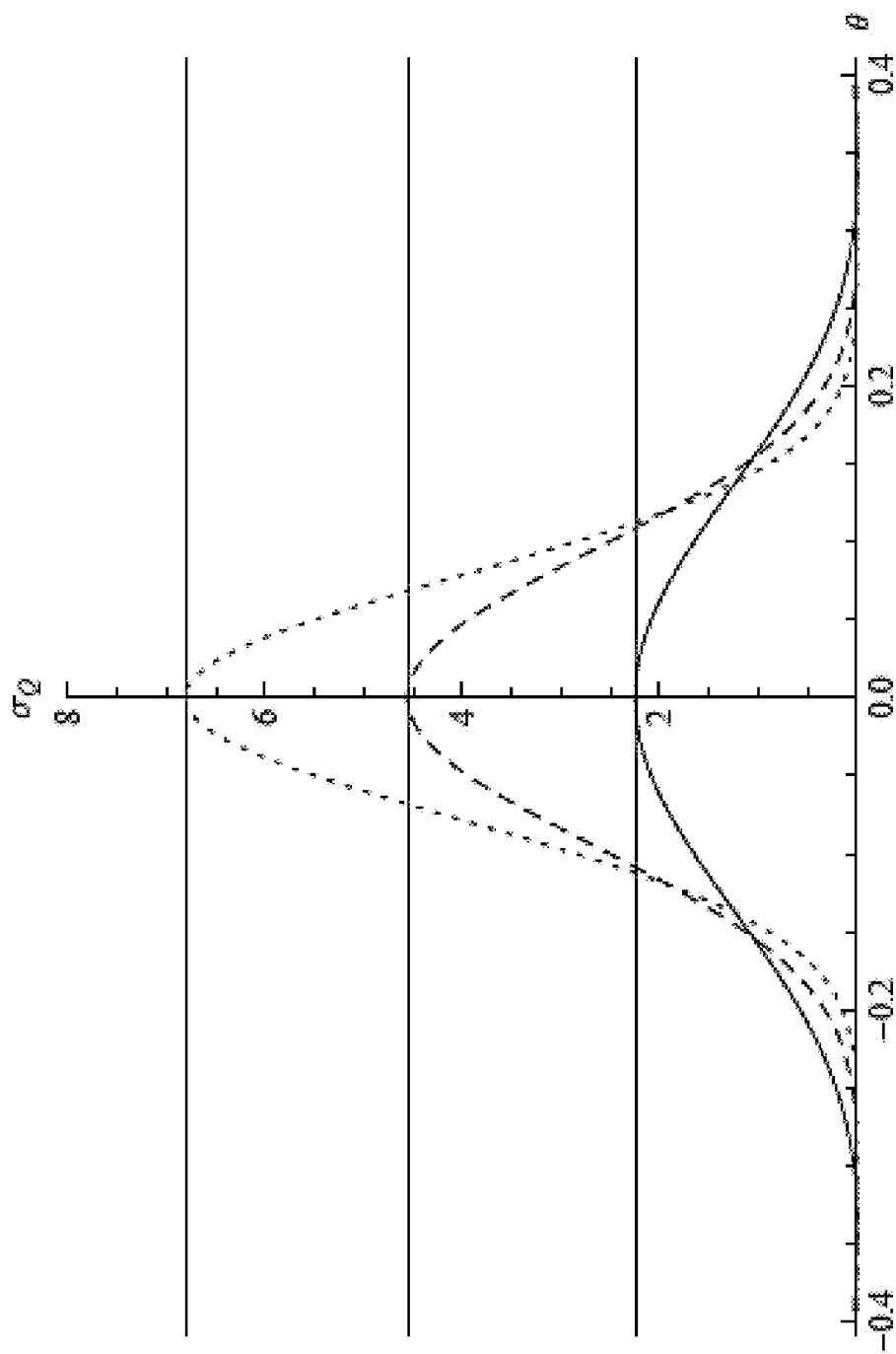
FIG. 6 is a graphical representation illustrating the main lobe of the quantum cross section ($\sigma_Q$) as a function of the azimuthal angle ($\theta$) according to an embodiment herein.

Next, the particular case of a rectangular target is considered (this geometry is chosen because it is relatively easy to program in numerical simulation codes). FIG. 6 shows the plots of $\sigma_Q$ vs. $\theta$($\phi$=0) for $n_\gamma$=1, 2, and 3 photons. As a reference, the maximal value of the classical radar cross section for the same target looked at in the specular direction ($\theta$=0) corresponds to the maximal value of the quantum cross section for one photon observed in the specular direction. FIG. 6 illustrates the detail of the main lobe of the quantum cross section ($\sigma_Q$) as a function of the azimuthal angle ($\theta$) with a fixed polar angle ($\phi$=0) for 1 incident photon, (solid line), 2 incident photons (dashed line), and 3 incident photons (dotted line). The horizontal grid lines are located at $\sigma_Q$=2.25, 4.56, and 6.81. It can be observed that as the number of photons increases, so does the peak of the maximum value of $\sigma_Q$ at the specular orientation. That is, a target near the specular direction appears to look bigger when illuminated with a quantum sensor. This is a pure quantum-mechanical effect due to the interference terms that lead to Equation (42). Thus, only in the case of beams of classical light will one expect to see the same cross sections without regard to the number of photons per beam.

However, as the number of photons increases, the sidelobe structure decreases dramatically and the width of the specular orientation peak becomes more narrow (the sidelobe structure is not shown in FIG. 6). Such behavior is to be expected. Indeed, the interferometric analysis only takes into consideration specular returns and the associated sidelobe structure is due to quantum interference. As the number of photons increases, the dynamics of the scattering transition to the classical domain. In such a case, one would expect that $\sigma_Q$ will be extremely narrow at the specular direction and without sidelobes. That is, this behavior makes evident the large photon number limit for $\sigma_Q$:

$$\lim_{n_\gamma \to \infty} \sigma_Q \propto \sigma_C \propto \delta(\theta) \tag{47}$$

which corresponds to specular returns without end-region contributions. This further shows that the quantum sidelobe structure is not related to the sidelobe structure observed in the context of classical radar cross sections. That is, both the width of the main lobe and the sidelobe structure are purely quantum mechanical features.

Numerical values for the peak value of the quantum radar cross section on the main ($\theta$=0) lobe are given in Table 1 below. The growth ratio $G_r(n_\gamma)$ and the total growth ratio $G_t(n_\gamma)$ are defined as:

$$G_r(n_\gamma) = \frac{\sigma_Q^{Max}(n_\gamma)}{\sigma_Q^{Max}(n_\gamma - 1)} \quad G_t(n_\gamma) = \frac{\sigma_Q^{Max}(n_\gamma)}{\sigma_Q^{Max}(1)} \tag{48}$$

where $\sigma_Q^{max}(n_\gamma)$ is the maximal value of $\sigma_Q$ for $n_\gamma$ photons. Thus, it can be observed that there is a steady decrease in its value as the number of photons increases. Furthermore, one can expect that the growth ratio will steadily decrease to zero for a large number of photons.

TABLE 1

Peak values of the quantum radar cross section on the main ($\theta = 0$) lobe

| No. of Photons | Main Lobe Peak | Growth Ratio | Total Growth Ratio |
| --- | --- | --- | --- |
| 1 | 2.24912 | — | — |
| 2 | 4.55989 | 2.02741 | 2.02741 |
| 3 | 6.80988 | 1.49343 | 3.0278 |
| 4 | 9.10436 | 1.33693 | 4.04797 |
| 5 | 11.0753 | 1.21648 | 4.92427 |

Because of the correspondence principle, we expect that the quantum radar cross section will become the classical radar cross section for a large number of photons. However, a large number of photons is not enough to guarantee the correspondence principle. Indeed, the Fock states used for the computation of the quantum radar cross section are non-classical even with a large number of photons. To obtain the principle of correspondence one needs to explicitly use coherent states with large average photon numbers. It is only in such a case that the expression for the contributions to the intensity becomes an equality:

$$\langle I_{12} \rangle = \langle I_1 \rangle \langle I_2 \rangle \tag{49}$$

which means that there are no interference effects and as a consequence there will be no change to the value of the radar cross section. Therefore, in the small photon number regime, it appears that specular returns and quantum interference are the principal contributors to the value of $\sigma_Q$.

Theoretical Performance in a Noisy Environment: Next, the theoretical performance of the following three types of standoff sensors are compared:

(A) A quantum sensor that uses 2-mode entangled photon states (a signal and an ancilla);

(B) A coherent light sensor (such as a lidar) that uses non-entangled states of light; and (C) A classical sensor system (e.g. radar or sonar).

Detection Error Probability: The detection error probability E can be chosen as a measure of performance. The analysis will be limited to the extremely low signal-to-noise ratio: SNR≤12×10$^6$. The sensing is assumed to be is carried out by sending 10$^6$ pulses. That is, the quantum system needs to create 10$^6$ 2-mode Gaussian entangled photon states, the coherent sensor sends 10$^6$ unentangled photons, and a coherent integration of 10$^6$ classical radar pulses is performed (this is known to be the most optimal way to combine information from several classical radar pulses).

The equations that describe the detection error probability for the entangled and coherent light sensors are established using standard quantum optics techniques considering Gaussian signal states. In the low brightness, high noise, low reflectivity regime:

$$N_s \ll 1$$

$$N_b \ll 1$$

$$\kappa \ll 1 \tag{50}$$

where $N_s$ is the average photon number per mode, $\kappa$ is the reflectivity, and $N_b$ is the average photon number in the background. When these conditions are met, the upper bound for the detection error probability $\epsilon_q$ for the entangled photon sensor satisfies:

$$\epsilon_q \leq P_q \equiv \frac{e^{-M\kappa N_s/N_b}}{2} \tag{51}$$

and similarly, the detection error probability $\epsilon_l$ for the coherent light sensor is bounded by:

$$\epsilon_l \leq P_l \equiv \frac{e^{-M\kappa N_s/4N_b}}{2} \tag{52}$$

where in both equations, M is the number of signal pulses sent towards the target. These expressions suggest that the signal-to-noise ratio per signal pulse for these two sensor systems can be characterized by:

$$SNR \approx \frac{\kappa N_s}{N_b} \tag{53}$$

Furthermore, it can be shown that, if SNR<<1, then the above bounds for $\epsilon_q$ and $\epsilon_l$ remain valid within a relatively small percentile error.

For the comparative analysis, a challenging environment can be characterized by SNR≈10$^{-6}$ per signal pulse (the attenuation effects of the environment are included in this expression). As a consequence, M≈10$^6$ entangled/unentangled photon states are required to raise the effective signal-to-noise level to the order of one.

On the other hand, the coherent integration of classical radar pulses is carried out using basic probability theory arguments. While obtaining an exact equation is a very complicated problem, Albersheim proposed a good approximate solution using the following empirical formula:

$$SNR_n = \frac{A + 0.12AB + 1.7B}{n} \tag{54}$$

where the $SNR_n$ is the (numeric) signal-to-noise-ratio per pulse, n is the number of independent pulses integrated, and:

$$A = \ln\left(\frac{0.62}{P_{fa}}\right) \tag{55}$$

$$B = \ln\left(\frac{P_d}{1-P_d}\right)$$

where $P_d$ is the probability of detection and $P_{fa}$ is the probability of false alarm. Thus, the detection error probability bound $P_c$ for this case is given by:

$$P_c = 1 - P_d \tag{56}$$

The above equations are reported to be accurate within 2 dB for $0.1 \leq P_d \leq 0.9$ and $10^{-7} \leq P_{fa} \leq 10^{-3}$. For the comparison analysis, the value of $P_{fa}=10^{-3}$ is used, which is the less rigorous case for the classical radar sensor.

Figure 7:
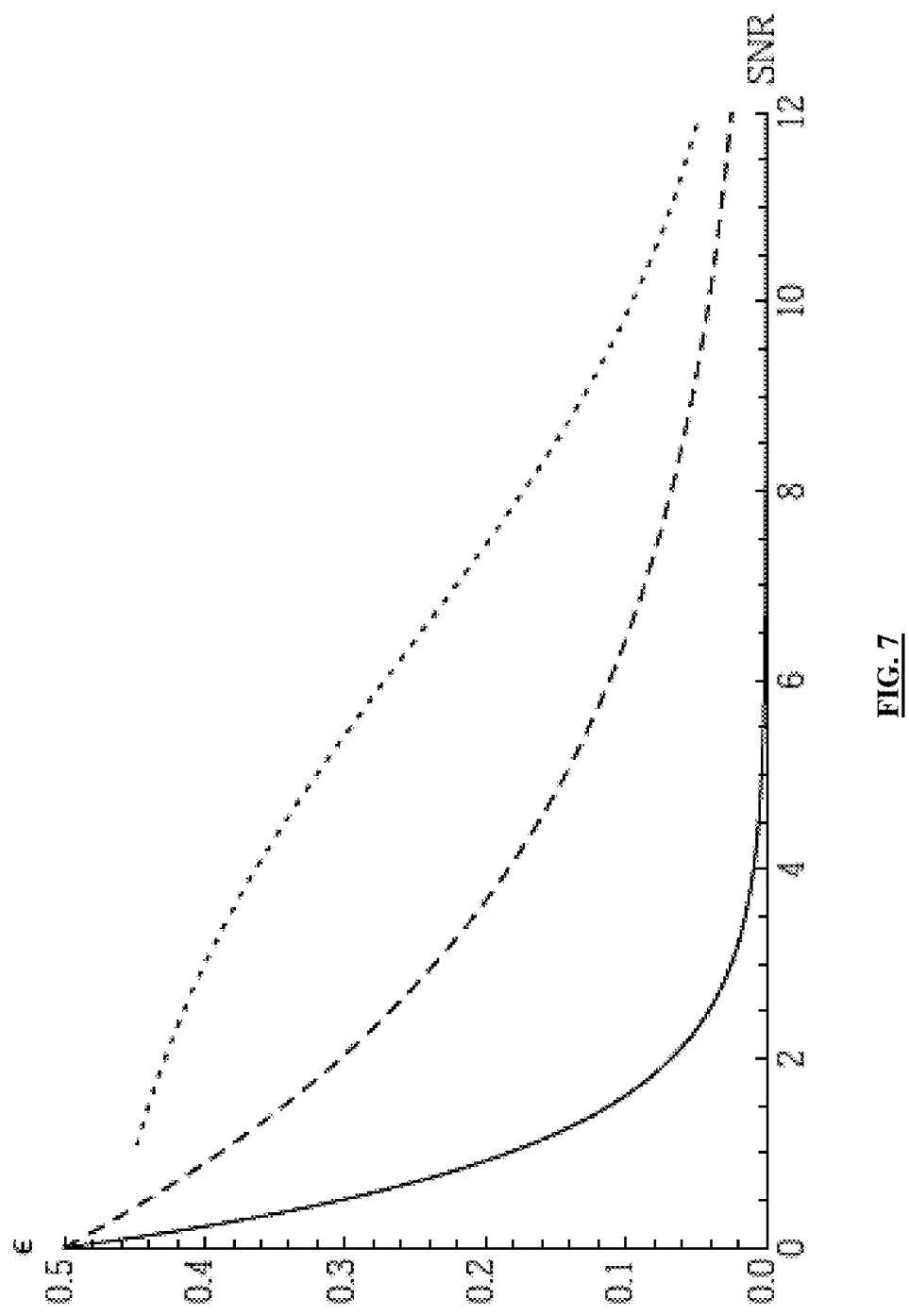
FIG. 7 is a graphical representation illustrating the detection error probability upper bound $\epsilon$ as a function of the signal-to-noise ratio (SNR) according to an embodiment herein.

FIG. 7 shows the comparative performance of the three sensors based on the detection error probability upper bound. More specifically, FIG. 7 illustrates the detection error probability upper bound $\epsilon$ for M=10$^6$ entangled photon states (solid line), coherent unentangled photon states (dashed line), and a coherent integration of classical radar pulses (dotted line), with respect to the signal-to-noise ratio (SNR) in units of 10$^{-6}$. It can be observed that, in the low signal-to-noise ratio and low brightness regime, the quantum sensor is much better than the coherent and the classical sensors, in agreement with results previously reported in the literature. However, if the SNR is too small, then all sensors have a detection error probability of nearly 50%. Also, if the SNR is large enough, then all sensors have a detection error probability that asymptotically approaches zero. In such a case, the quantum sensor does not offer any advantage over the coherent or the classical system. The signature of the target is amplified if illuminated with a quantum sensor, which may result in an even smaller detection error probability.

Stealth: The main challenge for any type of underwater sensor is the signal attenuation produced by sea water. In the case of sound, the attenuation in sea water is of about $\chi^{(a)} \approx 10^{-5}$ m$^{-1}$ for a sound wave of 1 kHz. On the other hand, in the case of light, in the clearest ocean waters, $\chi \approx 10^{-2}$ m$^{-1}$ for a wavelength of 480 nm. Also, for the case of high frequency microwaves ($10^7$ to $10^9$ Hz), the attenuation of the signal is practically total. That is, these radio waves are unable to penetrate a body of water deeper than a few centimeters.

These values reflect the well-known fact that, in the underwater environment, sound transmits much better than optical light and microwaves. In what follows it will be assumed that the quantum imaging system operates in the narrow green-blue regime, at around 460-480 nm, as this is the region of the spectrum where optical electromagnetic radiation is absorbed the least by sea water.

Figure 8:
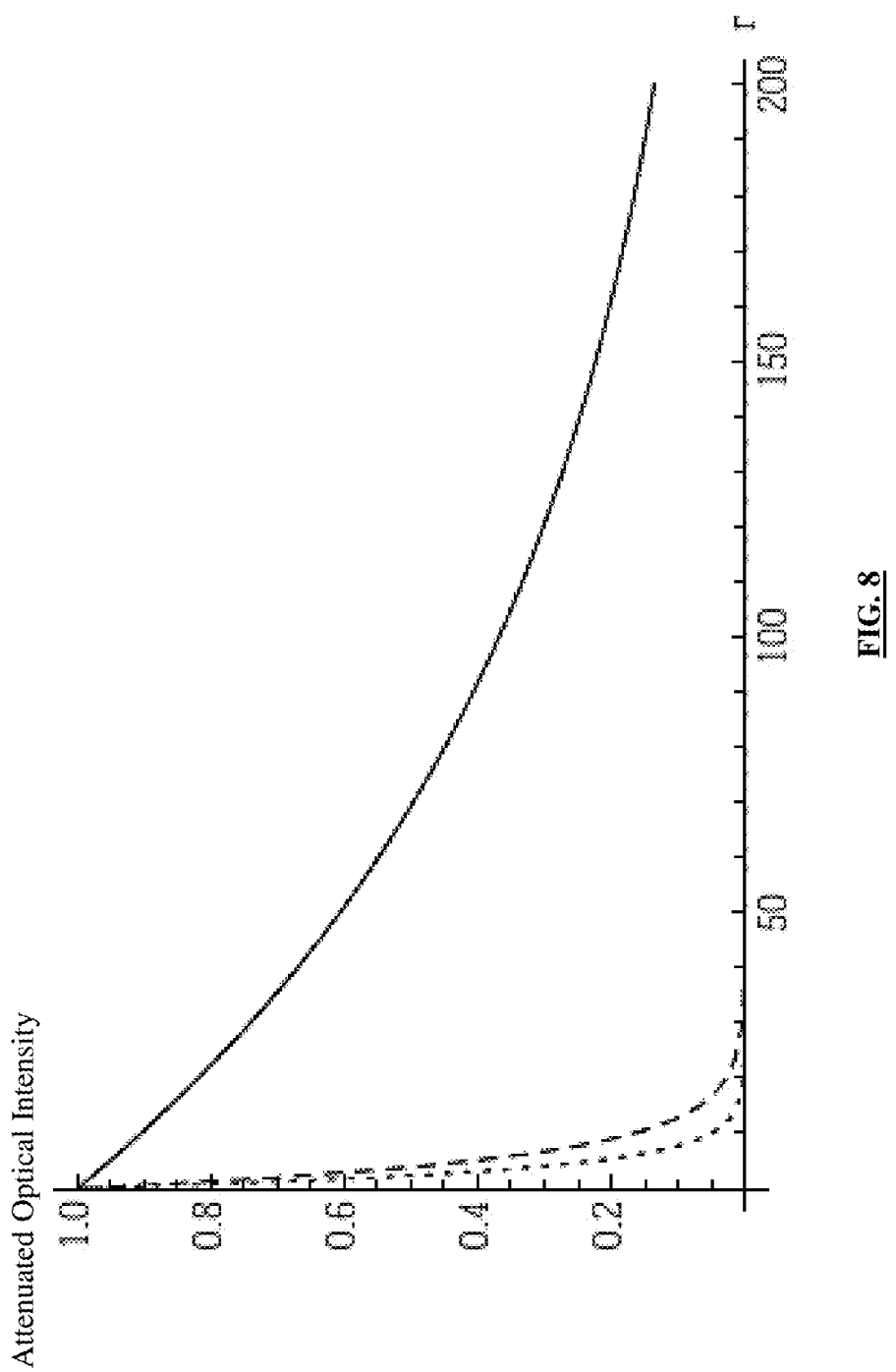
FIG. 8 is a graphical representation illustrating the attenuation of an optical beam as a function of the traversed distance r according to an embodiment herein.

FIG. 8 shows the attenuation of an optical beam (e$^{-\chi r}$) at $\lambda$=480 nm by clear (solid line; $\chi$=0.01 m$^{-1}$), intermediate (dashed line; $\chi$=0.18 m$^{-1}$), and murky (dotted line; $\chi$=0.3 m$^{-1}$) oceanic waters with respect to the traversed distance r. Arctic waters are usually clear, which means that an optical beam will lose 80% of its intensity after about 200 m. On the other hand, if the Arctic water is murkier, then the same level of intensity can only be reached at around 10 or 15 m.

Figure 9:
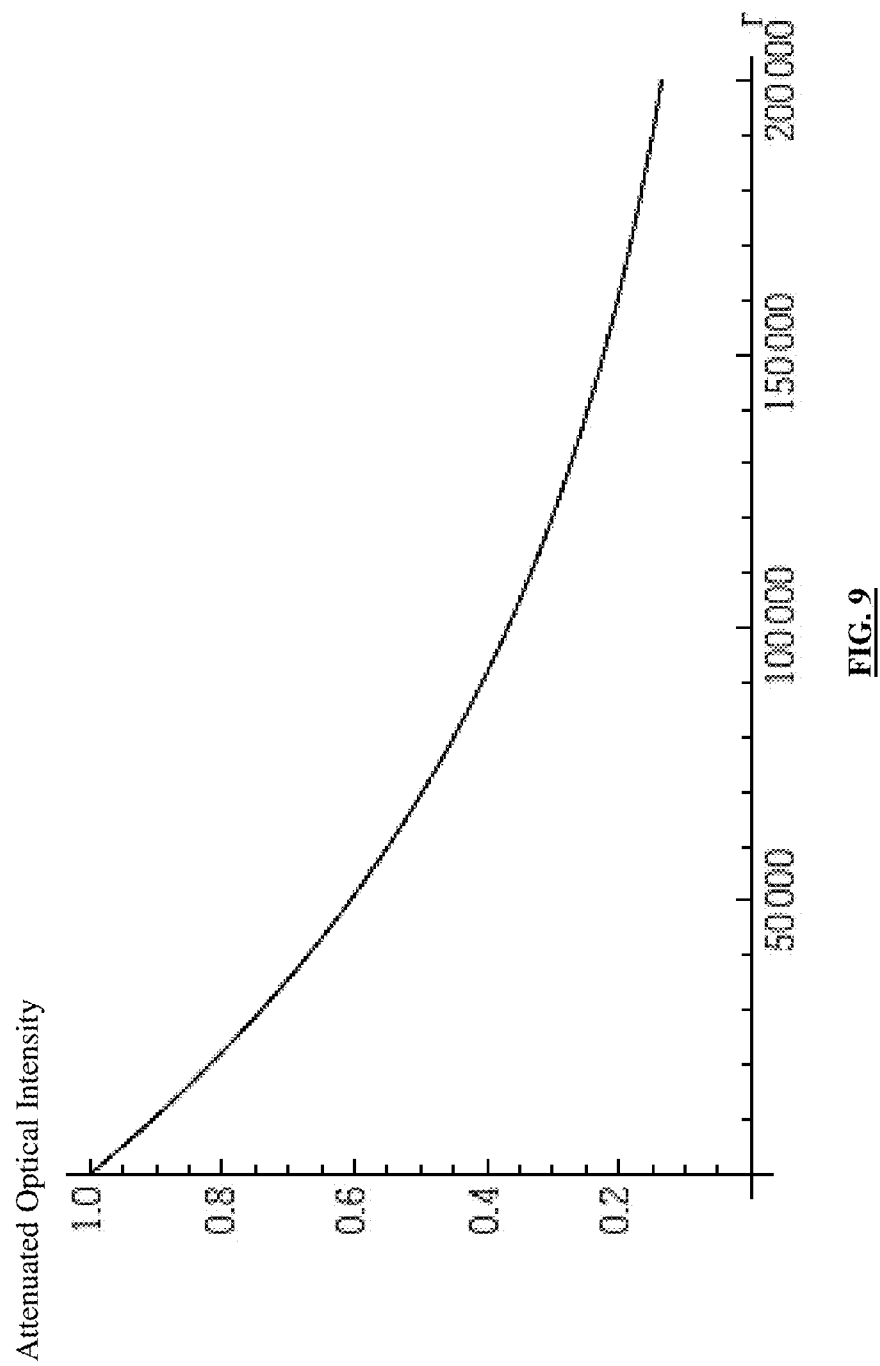
FIG. 9 is a graphical representation illustrating the attenuation of an acoustic signal of 1 kHz in typical oceanic conditions according to an embodiment herein.

On the other hand, FIG. 9 shows the attenuation of an acoustic signal (e$^{-\chi^{(a)} r}$) at 1 kHz in typical oceanic conditions. While the acoustic attenuation coefficient $\chi^{(a)}$ is variable and depends on salinity, depth, and temperature, it tends to be of the order of $10^{-5}$ m$^{-1}$ for Arctic waters. Thus, an acoustic signal will lose 80% of its intensity after about 200,000 m.

Clearly, the optical attenuation produced by saltwater severely limits the operational range of an underwater photonic sensor. However, this is not a bad feature if one is exclusively interested in stealth sensing over relatively short distances. Indeed, for Arctic underwater navigation we are mostly interested in the optical imaging and detection of underwater ice structures (as mines and other underwater vehicles can be detected through their unique electromagnetic or acoustic signatures using passive sensing devices).

Figure 10:
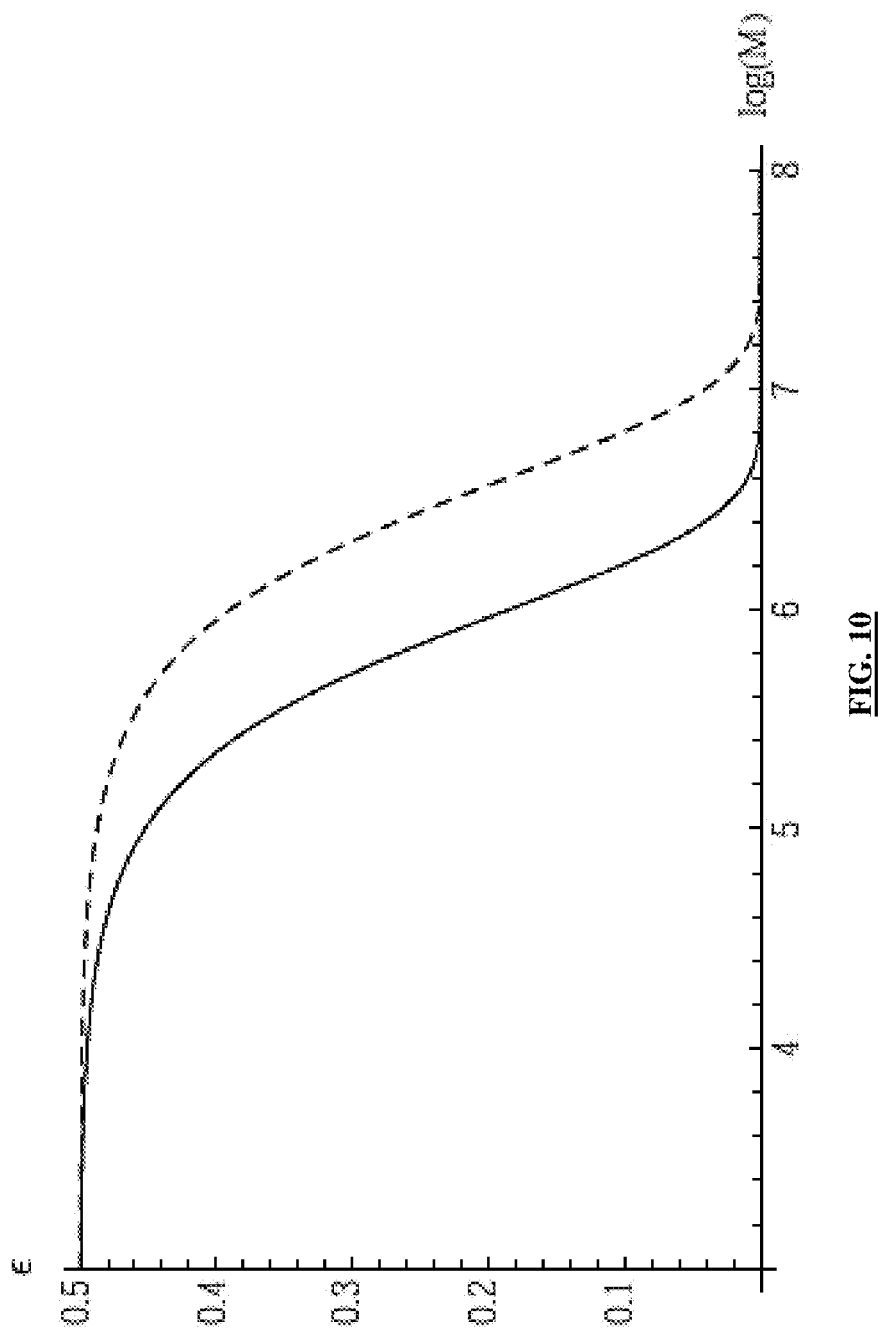
FIG. 10 is a graphical representation illustrating the detection error probability upper bound $\epsilon$ as a function of the logarithm of the number of signals according to an embodiment herein.

Optimal Signal Intensity: FIG. 10 shows the behavior of the detection error probability upper bound $\epsilon$, with respect to the logarithm of the number of signals $\log_{10}$ M when SNR=$10^{-6}$ for entangled (solid line) and unentangled (dashed line) photon states. It is observed that if M is too small, both sensors lead to a similar large detection error probability $\epsilon \approx 0.5$. On the other hand, if M is too large, then any possible advantage offered by the entangled photon system is shattered by the large number of unentangled photons in the coherent source.

Therefore, it is preferable to find the optimal number of signal photons that will lead to the greatest advantage offered by the entangled-photon system. To this end, $\Delta \epsilon$ is defined as the difference of the upper bounds of the detection error probability for the entangled and non-entangled sensors:

$$\Delta \epsilon \equiv P_f - P_q \tag{57}$$

Of interest is the value of M that maximizes $\Delta \epsilon$.

Figure 11:
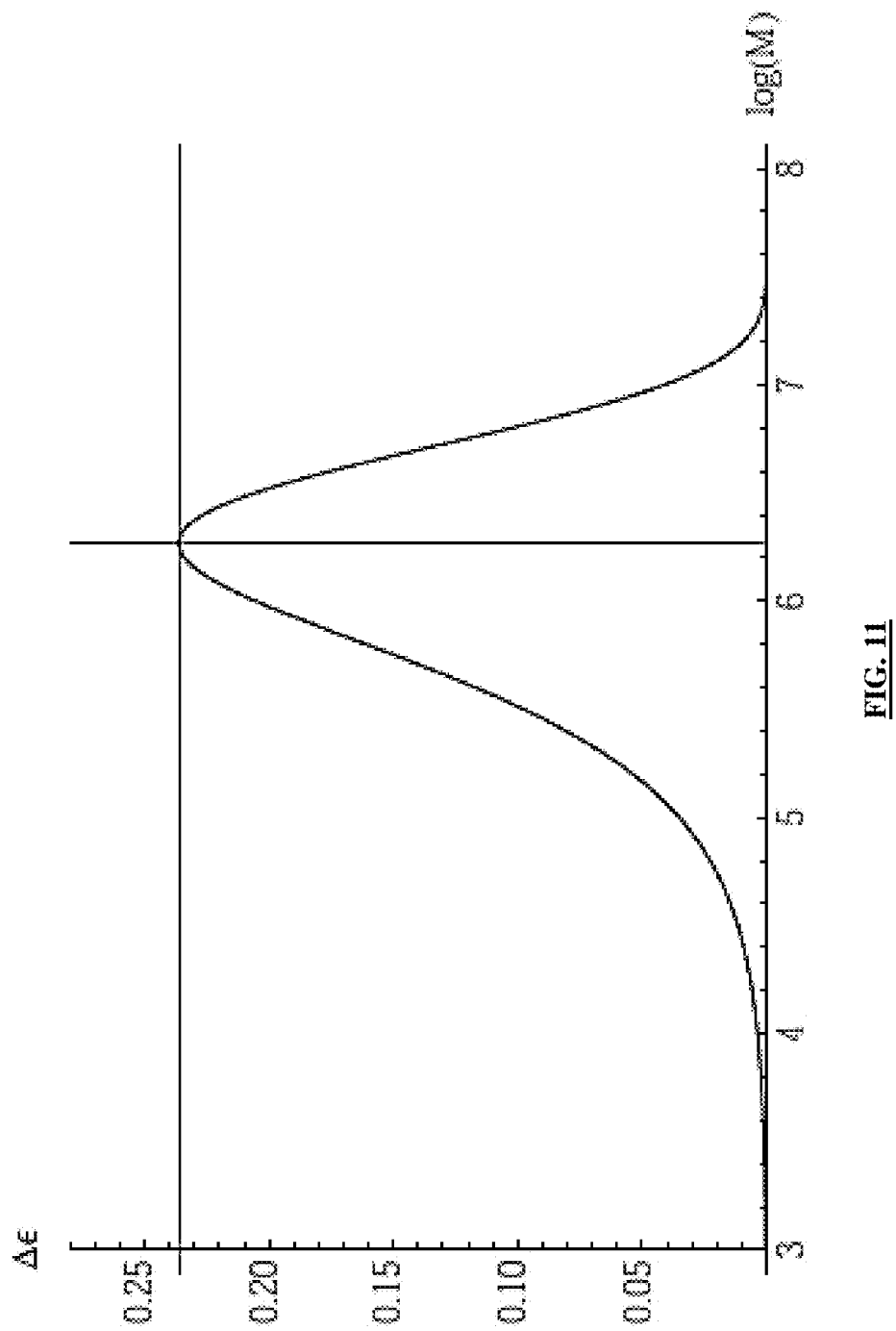
FIG. 11 is a graphical representation illustrating the difference in the detection error probability upper bounds $\Delta\epsilon$ as a function of the logarithm of the number of signals according to an embodiment herein.

FIG. 11 shows the behavior of $\Delta \epsilon$ with respect to $\log_{10}$ M when SNR=$10^{-6}$, which clearly shows that $\Delta \epsilon$ has a maximal value. More specifically, FIG. 11 illustrates the difference in the detection error probability upper bounds for the entangled and non-entangled photon states with respect to the SNR in units $10^{-6}$ when M=$10^6$. The exact maximal value of M, denoted by $\tilde{M}$, can be found analytically through:

$$\frac{d}{dM} \Delta \epsilon = \frac{1}{2} \left( \alpha e^{-M\alpha} - \frac{\alpha}{4} e^{-M\alpha/4} \right) = 0 \tag{58}$$

which results in:

$$\tilde{M} = \frac{4 \ln 4}{3\alpha} \propto \frac{1}{\alpha} \tag{59}$$

where $\alpha \equiv$ SNR. Indeed, for the case of SNR=$10^{-6}$, $\log_{10} \tilde{M} \approx 6.2668$, which is in agreement with the numerical value observed in FIG. 11. Furthermore, the maximal value of $\Delta \epsilon$, reached at $\tilde{M}$, is given by:

$$\tilde{\Delta \epsilon} = \frac{3}{8} 4^{-1/3} \approx 0.2362 \tag{60}$$

This result can be confirmed by looking at FIG. 11, as $P_f(\tilde{M}) \approx 0.3150$ and $P_q(\tilde{M}) \approx 0.0787$. The value of $\tilde{\Delta \epsilon}$ is completely independent of the signal-to-noise ratio. In other words, $\tilde{\Delta \epsilon}$ is the maximum improvement that one can expect from the system, regardless of the level of noise.

Figure 12:
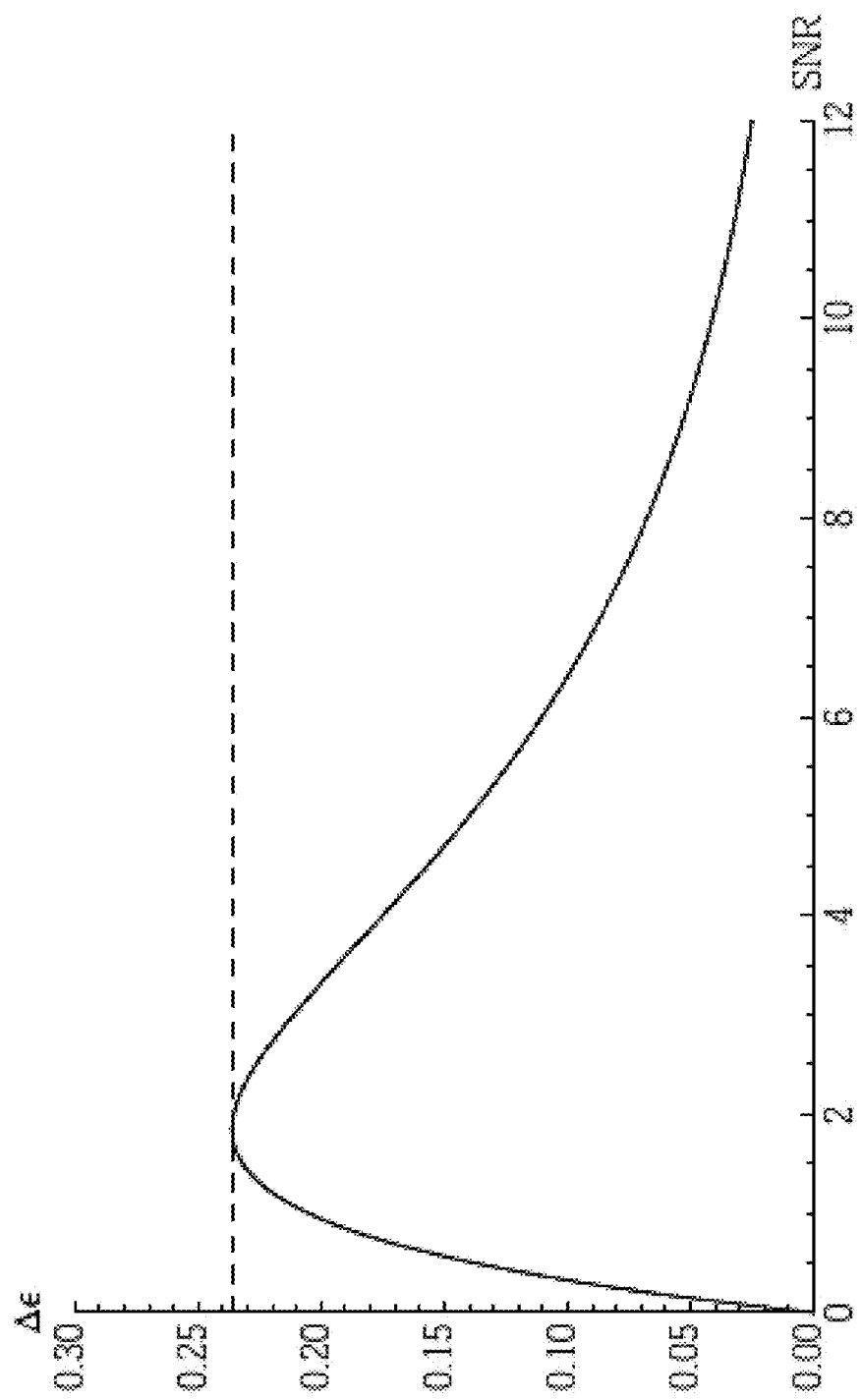
FIG. 12 is a graphical representation illustrating the difference in the detection error probability upper bounds $\Delta\epsilon$ as a function of the SNR according to an embodiment herein.

Similarly, FIG. 12 shows the difference in the detection error probability upper bounds for the entangled and non-entangled photon states with respect to the SNR in units of $10^{-6}$ when M=$10^6$. It can be observed that, given the value of M, the system is optimal for a specific value of SNR, and the maximum improvement is bounded by $\tilde{\Delta \epsilon}$.

Thus far, the above describes a sensor that can detect, with some probability of error, the presence or absence of an underwater obstacle. The terrain estimation module 32 of FIG. 4A uses data from the photonic sensor module 22 to rasterize an image of the underwater canopy and other obstacles encountered by the underwater vehicle 12. That is, a determined solid angle of the space ahead of the receiver 11 of FIG. 3 has to be divided in n sub-regions, and the photonic sensor module 22 will determine the presence or absence of obstacles for each and all of these sub-regions. For all means and purposes, the result is a raster image of the region ahead of the receiver 11.

Expected Performance in Clear Arctic Waters: The following ignores all possible sources of noise, except for the optical attenuation produced by clear Arctic seawater. It is also assumed that the target 6 is a perfect reflecting surface. These assumptions allow one to establish upper bounds for the theoretical performance that characterizes the best case scenario for the sensing devices.

Under these assumptions, the signal-to-noise ratio for a single photon state signal that propagates over a distance r is given by:

$$SNR = \frac{\kappa N_s}{N_b} = \frac{N_s}{N_b} e^{-\chi r} \tag{61}$$

where $\chi$ is the water's attenuation constant. For clear Arctic waters, $\chi \approx 0.01$ m$^{-1}$. The average number of photons in the signal Gaussian state is given by $N_s \approx 10^{-4}$, as observed in SPDC experiments. Also, sunlight is the principal source of optical noise in the underwater environment. If one assumes that the sun radiates as a black body, then, according to Planck's law:

$$N_b \frac{1}{e^{\hbar\omega/kT} - 1} \quad (62)$$

where T is the temperature, $\omega$ the frequency of the photons, and k the Boltzmann constant. Taking the temperature of the surface of the sun as T=6000° K. and blue light at $\lambda$=480 nm, then $N_b \approx 10^{-2}$.

Detection Error Probability Bounds: The case where SNR=2×10$^{-6}$ is considered. Using the expressions found above, the most optimal number of entangled photon states is $\log_{10} \tilde{M} \approx 5.97$, and the detection error probability upper bounds are given by:

$$P_q \approx 0.08$$

$$P_l \approx 0.32$$

$$P_c \approx 0.43 \quad (63)$$

for the entangled, coherent, and classical systems, respectively. That is, in this situation the entangled photon system is 4 times better than the coherent light system, and 5.38 times better than the classical sensor.

A SNR$\approx 2 \times 10^{-6}$ in clear oceanic waters is produced when the photons traverse a distance of about 852 m. In other words, the distance from the target to the sensor is of about R$\approx$426 m (half the roundtrip distance). Equivalently, if one sends $\tilde{M}=10^{5.97} \approx 924196$ signal photon states, then one can expect that only $\tilde{M}e^{-\chi 2R} \approx 184$ signal photon states will be able to complete the round trip. These 184 photon states are processed to give the values of $P_q$ and $P_l$ given above.

Figure 13:
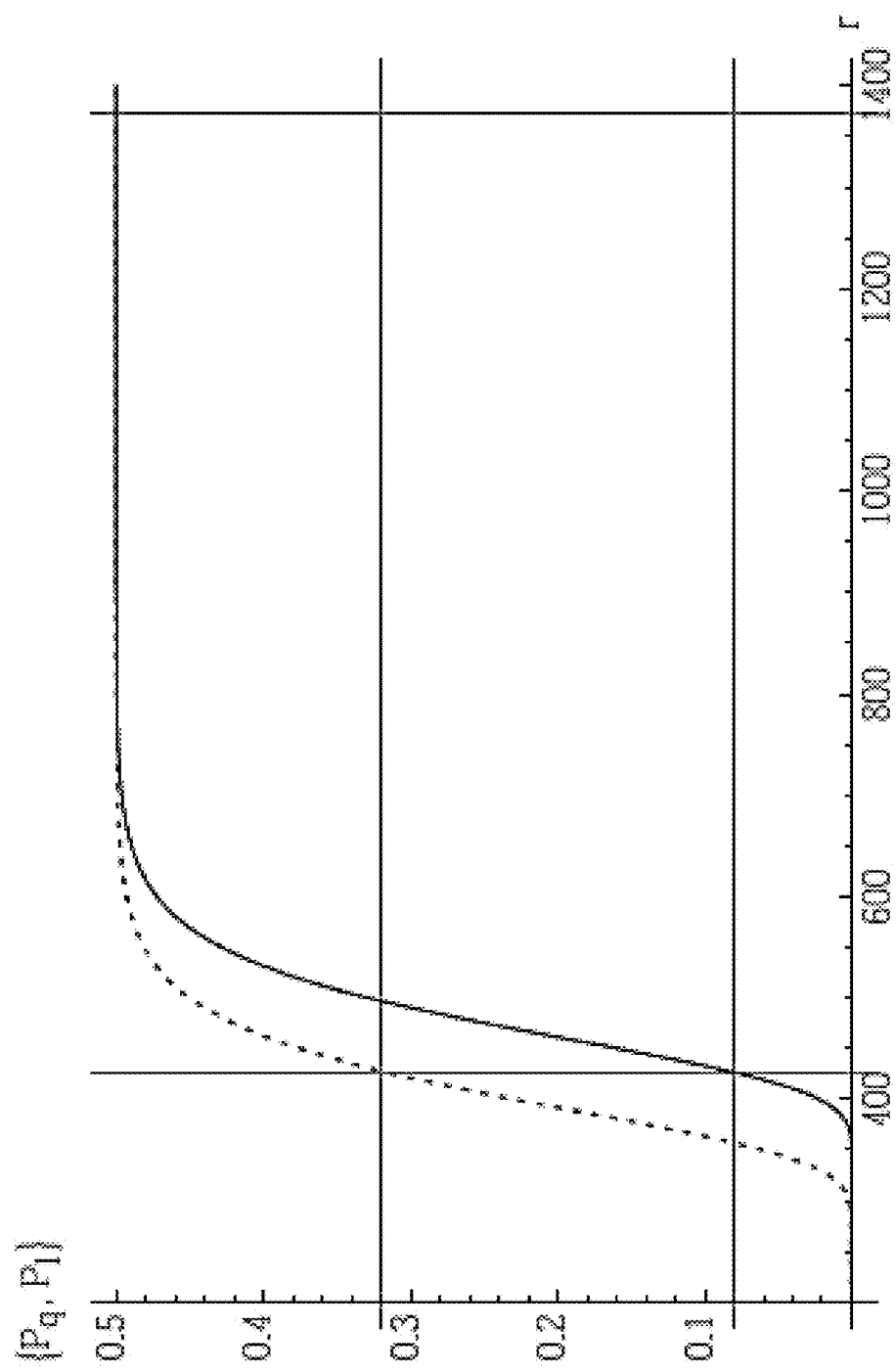
FIG. 13 is a graphical representation illustrating the detection error probability bounds $P_q$ and $P_l$ as a function of the distance to the target r according to an embodiment herein.

FIG. 13 shows the detection error probability bounds $P_q$ (solid line) and $P_l$ (dashed line) with respect to the distance to the target r in clear ocean waters using $\tilde{M}$ photons. After about 800 m, the detection error probability bounds become very close to 0.5. Also, below 300 m there is very little difference in the performance of the entangled and coherent imaging systems. The first vertical grid locates the optimal distance of 426 m, in which the entangled imaging system has a detection error probability of 0.08, while the coherent system has a detection error probability of 0.32.

As described above, the condition for surviving entanglement at the detector, once the entangled signal photon states have completed the round trip to the target, is given by:

$$\kappa > N_b \Rightarrow e^{-\chi 2R} > N_b \Rightarrow R < -\frac{\ln N_b}{2\chi} \approx 230 \text{ m} \quad (64)$$

That is, for targets farther away than 230 m, the entanglement is completely obliterated by the noisy environment. But nonetheless, as shown above, entanglement continues to provide a detection error probability advantage for a target located at 426 m. As explained before, even though the entanglement disappears, some of the quantum correlations persist.

FIG. 13 also makes evident that the plot of $P_q$ is the same as $P_l$, but shifted to the left. Indeed:

$$P_q(r) = \frac{e^{-\tilde{M} N_s \kappa(2r)/N_b}}{2} \quad P_l(r) = \frac{e^{-\tilde{M} N_s \kappa(2r)/4N_b}}{2} \quad (65)$$

where the factor of 2 in the exponent takes into account the round trip taken by the photon states. Then:

$$P_q(r) = P_l(r-z) \Leftrightarrow e^{-\tilde{M} N_s \kappa(2r)/N_b} = e^{-\tilde{M} N_s \kappa(2r-2z)/4N_b} \quad (66)$$

and as a consequence:

$$4\kappa(2r) = \kappa(2r-2z) \Rightarrow e^{\chi 2z} = 4 \Rightarrow z = \frac{\ln 4}{2\chi} \quad (67)$$

which for the case in consideration results in z$\approx$69 m. In other words, with the same number of photons, the entangled system gives the same performance as the unentangled system, but with a 69 m improvement in range to target. Naturally, as the attenuation coefficient grows, this range advantage decreases.

Stealthiness: Regarding the stealthy operation of the system, it is easy to check that, at a distance of $R_e \approx 1374$ m, less than one out of the $\tilde{M}$ photon states will survive the effects of attenuation: $\tilde{M}e^{-\chi R_e} \approx 0.9967 < 1$. Therefore, it is extremely unlikely that any other sensor outside a range of 1374 m from the underwater vehicle 12 will be able to measure any signal photon states. That is, the system is practically invisible outside a range of 1374 m, but manages to give a detection error probability of less than 0.1 for a target 6 located 426 m away from the vehicle 12.

If the adversaries place sensors inside the stealthy range of operations of the quantum imaging system (i.e., within 1374 m), their detection systems may be able to measure at least one out of the $\tilde{M}$ photon states. This could be done, for example, if the adversary deploys several Unmanned Underwater Vehicles (UUV's) across the entire area of operations. In this case, depending on the number of measured photons, the adversaries will suspect with some probability the presence of our quantum imaging system. However, they will have a considerable amount of error in trying to determine if a given measured photon state is signal or noise, because they would not have access to the entanglement correlations. Indeed, as described above, the stealth strategy of the quantum imaging system 5 is to "hide" the signal photons in the environment noise.

To precisely determine how difficult the adversary's signal photon interception and identification task will be, an objective and commensurable definition of what stealth means is needed. Indeed, stealth vehicles are not completely invisible to a given sensor, but their signature is below some pre-defined threshold.

In a rather arbitrary manner, a stealthy imaging system can be defined if the detection error probability of an adversary that uses the radiation of the imaging system 5 to localize the underwater vehicle 12 is at least 0.4. This detection error probability bound is completely arbitrary, and one could choose a different set of numbers given the risk constrains of the actual naval operation.

Similar to security proofs in cryptography, it is assumed that the adversaries have the most advantageous position available to them. In this case, the adversaries have exact knowledge of where the signal photon state beams are pointed at, and they have a perfect detector measuring all these states. Then, the interception error probability for an adversarial sensor located at a distance r from the entangled photons imaging system 5 onboard the underwater vehicle 12 is given by:

$$\pi_q = \frac{e^{-\tilde{M}N_s e^{-\chi r}/4N_b}}{2} \quad (68)$$

To ease the stealthiness analysis, it is assumed that a coherent sensor has the exact same detection error probability as an entangled photon sensor. This can be done at the expense of a larger number of unentangled photon states. Indeed, if one uses four times the number of entangled photon states, then both systems have the same detection error probability. Then, the interception error probability for an adversarial sensor located at a distance $\tilde{r}$ from the coherent imaging system operating with $4\tilde{M}$ photons onboard the underwater vehicle 12 is given by:

$$\pi_l = \frac{e^{-\tilde{M}N_s e^{-\chi r}/N_b}}{2} \quad (69)$$

In other words, while the entangled system is using $\tilde{M}$ photon states, the coherent system has to use $4\tilde{M}$ unentangled photon states, so both can have the exact same detection error probability.

Figure 14:
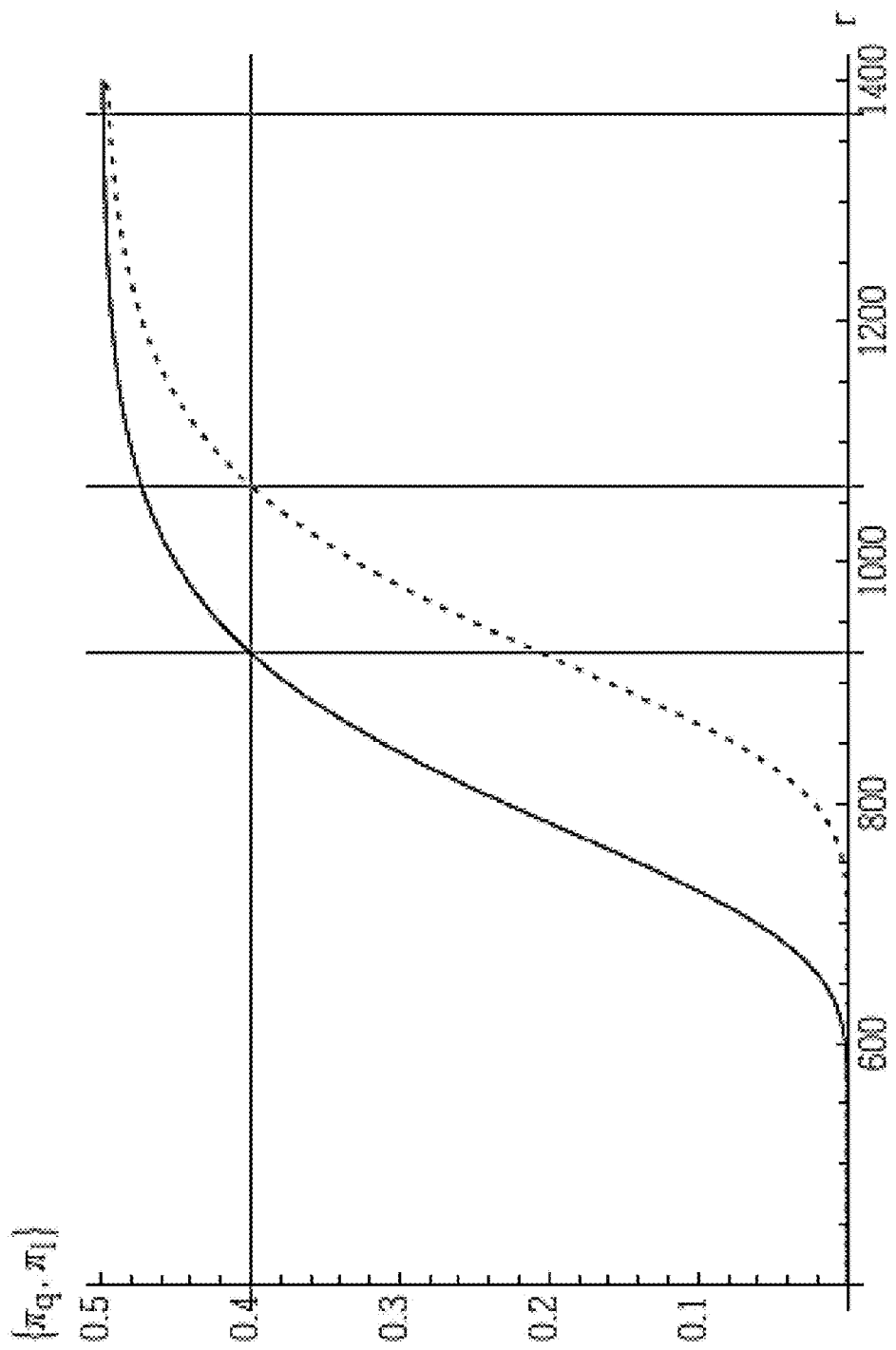
FIG. 14 is a graphical representation illustrating the interception error probability $\pi_q$ and $\pi_l$ as a function of the distance to an adversarial sensor located at a distance r according to an embodiment herein.

FIG. 14 shows the interception error probability for an adversarial sensor located at a distance r from the entangled photon imaging system ($\pi_q$, solid line) and the coherent imaging system ($\pi_l$, dashed line). If the adversarial sensors are located very close to the underwater vehicle 12 (i.e., within a 600 m range), these will be able to detect with very high probability the signal photon states, entangled or not.

It can also be observed that the entangled photon imaging system satisfies the stealthy imaging bound at 925 m. On the other hand, the coherent photon imaging system satisfies the stealthy imaging bound at 1063 m. Thus, the entangled photon imaging system is stealthier over an extra 138 m in comparison to the coherent imaging system.

Furthermore, one can observe from FIG. 14 that the plot of $\pi_q$ is the same as $\pi_l$, but shifted to the right. Indeed:

$$\pi_q(r) = \pi_l(r+z) \iff e^{-\tilde{M}N_s\kappa(r)/4N_b} = e^{-\tilde{M}N_s\kappa(r+z)/N_b} \quad (70)$$

and as a consequence:

$$\frac{1}{4}\kappa(r) = \kappa(r+z) \Rightarrow e^{-\chi z} = \frac{1}{4} \Rightarrow z = \frac{\ln 4}{\chi} \quad (71)$$

which for the case in consideration results in z≈138 m. In other words, even though for this particular example the entangled system has the same performance as the unentangled system, the entangled system has a 138 m improvement in stealthiness. Naturally, as the attenuation coefficient grows, this stealthiness advantage decreases.

Some components of the embodiments herein can include a computer program product configured to include a pre-configured set of instructions stored in non-volatile memory, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer executable instructions or data structures stored thereon. Such non-transitory computer readable storage media can be any available media that can be accessed by a special purpose computer, including the functional design of any special purpose processor, module, or circuit as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 15:
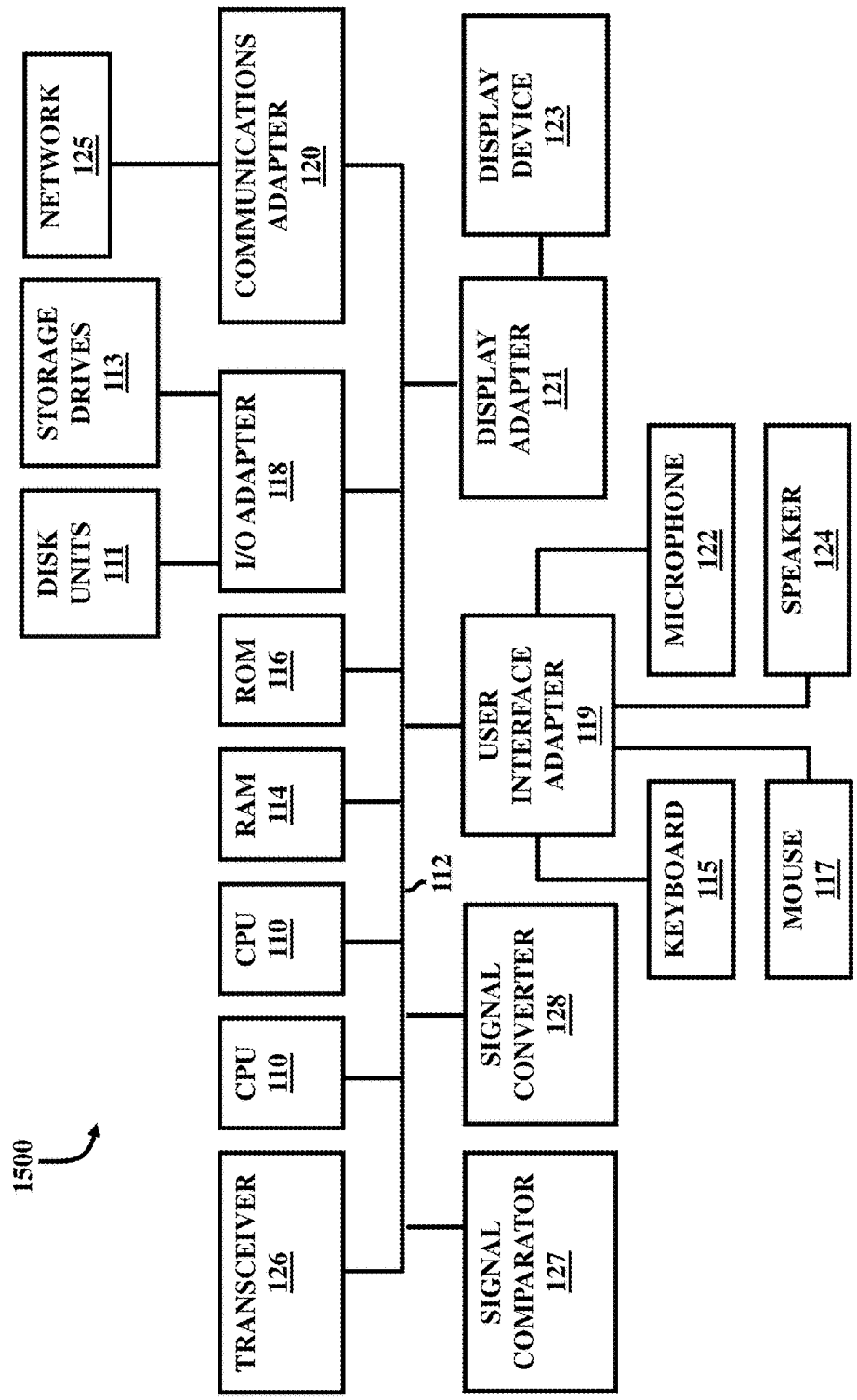
FIG. 15 is a schematic diagram illustrating an exemplary computer architecture used in accordance with the embodiments herein.

A representative hardware environment for practicing the embodiments herein is depicted in FIG. 15, with reference to FIGS. 1 through 14. This schematic drawing illustrates a hardware configuration of an information handling/computer system 1500 in accordance with an exemplary embodiment herein. The system 1500 comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and storage drives 113, or other program storage devices that are readable by the system. The system 1500 can read the inventive instructions on the program storage devices and follow these instructions to execute the methodology of the embodiments herein. The system 1500 further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example. Further, a transceiver 126, a signal comparator 127, and a signal converter 128 may be connected with the bus 112 for processing, transmission, receipt, comparison, and conversion of electric or electronic signals.

Generally, an underwater vehicle does not have access to radio-navigation aids, GPS and astronomical observations. Also, an underwater vehicle traveling in the Arctic is relatively close to the geomagnetic pole and the Earth's rotation axis, and as a consequence, common navigation tools such as compass and gyroscopes are plagued with large amounts of error. Furthermore, the variable Arctic ice canopy may severely damage the hull of an underwater vehicle.

To overcome these strict limitations, most underwater Arctic vehicles rely on active sonar arrays that determine the position of the ice, terrain, and other obstacles present at the front, top, and below the vehicle. However, this strategy is not stealthy and can compromise the position of the submarine in a combat scenario. The embodiments herein provide quantum sensors to overcome the problem of underwater Arctic navigation in a combat scenario. The system 5 provided by the embodiments herein operate with entangled photons in the blue-green regime. To this end, the receiver 11 utilizes biologically-inspired photosensors, which comprise novel materials in accordance with the quantum transport observed in photosynthetic systems.

The entanglement correlations are used to distinguish between noise and signal photons bounced back by the target 6. The system 5 is configured to operate with a low-brightness signal and immersed in a noisy environment. In a sense, the signal photons are "hidden" in the environment noise and entanglement correlations are utilized to retrieve them.

As described above, the expected theoretical performance of the imaging system 5 is analyzed in clear Arctic waters. It is experimentally determined that the entangled photon imaging system 5 provided by the embodiments herein is four times better than the coherent imaging system, and 5.38 times better than the classical sensor. These performance estimates were performed for a target at 426 m from the underwater vehicle 12 using approximately 106 signal pulses. For a target range of 426 m, the entanglement between the signal and ancilla photons 8, 9 is completely annihilated by the noisy environment, but nonetheless some of the original quantum correlations persist. These "surviving" quantum correlations are the reason for the expected advantage of the entangled imaging system 5 provided by the embodiments herein over the coherent imaging system.

The above described experimentation also demonstrates that the entangled imaging system 5 has a stealthiness advantage of 138 m in comparison to a coherent imaging system with the same detection performance. In addition, within the parameters of the example discussed, all the signal photon states emitted by the entangled imaging system 5 are completely dissipated by the underwater Arctic medium at about 1374 m. Even though water attenuation severely limits the operational range of the imaging system 5, the range is large enough to be used as a terrain estimation tool for underwater Arctic navigation. In this regard, the operational requirements of stealthy underwater vehicle Arctic navigation are ideal for entangled qubits.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A quantum photonic imaging device used in an underwater vehicle for stealthy detection of underwater objects, the device comprising:
    a photon generating module configured to generate an entangled pair of photons, wherein the pair of photons comprises a signal photon and an ancilla photon, and wherein said ancilla photon is retained within the device;
    a transmitter configured to transmit said signal photon towards a region of space for detecting an underwater object;
    a receiver configured to detect an incoming photon to the device, wherein said receiver comprises a photosynthetic material; and
    a correlation module configured to distinguish said signal photon that is reflected back to said receiver due to a presence of the object from environmental noise photons, wherein the distinguishing comprises determining an entanglement correlation of the detected photon with said ancilla photon, and wherein a presence of said entanglement correlation between said detected photon and said ancilla photon indicates that said detected photon is said signal photon reflected back from said object.

2. The device of claim 1, further comprising an information processing module configured to provide information using said detected photon to a terrain estimation module, wherein said correlation module detects said entanglement correlation between said detected photon and said ancilla photon.

3. The device of claim 2, wherein said object comprises any of an Arctic ice canopy, ocean bottom, and another natural or artificial obstacle in the water that can obstruct under-ice passage of the vehicle in Arctic waters.

4. The device of claim 3, wherein said information processing module is further configured to provide information about a range and geometry of said object to said terrain estimation module.

5. The device of claim 4, wherein said terrain estimation module uses the information provided by said information module for navigation of said vehicle.

6. The device of claim 1, wherein said photosynthetic material comprises a J-Aggregate material.

7. The device of claim 1, wherein said photon generating module generates photons using non-linear crystals.

8. The device of claim 1, wherein said correlation module determines said entanglement correlation using controlled interferometric metrology.

9. The device of claim 1, wherein said photon generating module is further configured to generate said signal photon with a brightness similar to a brightness of said environmental noise photons.

10. The device of claim 1, wherein said photon generating module is further configured to generate said entangled pair of photons with a variable wavelength.

11. The device of claim 10, wherein said photon generating module is further configured to vary the wavelength of said entangled pair of photons from approximately 460 nm to approximately 480 nm.

12. A method for stealthily detecting underwater objects by an underwater vehicle, said method comprising:
    generating an entangled pair of photons, wherein the pair of photons comprises a signal photon and an ancilla photon, and wherein said ancilla photon is retained locally in a photonic sensor module;
    transmitting, using a transmitter, said signal photon towards a region of space for detecting an underwater object;
    detecting, using a receiver, an incoming photon using photosynthesis; and
    determining an entanglement correlation of the detected photon with said ancilla photon to distinguish said signal photon that is reflected back to said receiver due to a presence of the object from environmental noise photons, wherein a presence of said entanglement correlation between said detected photon and said ancilla photon indicates that said detected photon is said signal photon reflected back from said object.

13. The method of claim 12, further comprising providing information about a range and geometry of said object using said detected photon when said entanglement correlation between said detected photon and said ancilla photon is detected.

14. The method of claim 13, wherein said object includes any of an Arctic ice canopy, ocean bottom, and another natural or artificial obstacle in the water that can obstruct under-ice passage of the vehicle in Arctic waters.

15. The method of claim 14, wherein said information about said range and geometry of said object is used for navigating said vehicle.

16. The method of claim 12, wherein the generating comprising generating said signal photon with a brightness similar to a brightness of said environmental noise photons.

17. A system for navigating an underwater vehicle, said system comprising:
    a quantum photonic imaging device configured to:
        generate an entangled pair of photons, wherein the pair of photons comprises a signal photon and an ancilla photon, and wherein said ancilla photon is retained within said quantum photonic imaging device;
        transmit said signal photon towards a region of space for detecting an underwater object;
        detect an incoming photon using a receiver; and
        determine an entanglement correlation of the detected photon with the ancilla photon to distinguish said signal photon that is reflected back to said receiver due to a presence of the object from environmental noise photons, wherein a presence of said entanglement correlation between said detected photon and said ancilla photon indicates that said detected photon is said signal photon reflected from said object; and a terrain estimation module configured to:
  receive information about a range and geometry of said object from said quantum photonic imaging device; and
  use said information for navigation of said vehicle.

18. The system of claim 17, further comprising:
a gravity sensor module configured to obtain location information by measuring a local gravitational field;
an inertial navigation module configured to obtain location information from any of a gyro, compass, accelerometer, and dead reckoning systems;
a global positioning system (GPS) module configured to obtain location information from GPS satellites; and
a sonar module configured to use an active sonar to measure a distance between said vehicle and said object, wherein said terrain estimation module is further configured to receive further information about said object and a location of the vehicle from one or more of said gravity sensor module, said inertial navigation module, said GPS module, and said sonar module, and use said information for navigation of said vehicle.

19. The system of claim 17, wherein said receiver comprises a photosynthetic material.

20. The system of claim 17, wherein said quantum photonic imaging device is configured to detect said incoming photon using photosynthesis.

* * * * *